(12) United States Patent
Chen

(10) Patent No.: US 12,334,963 B2
(45) Date of Patent: Jun. 17, 2025

(54) RADIO-FREQUENCY L-DRX DEVICE, RADIO-FREQUENCY TRANSCEIVING SYSTEM, AND COMMUNICATION APPARATUS

(71) Applicant: GUANGDONG OPPO MOBILE TELECOMMUNICATIONS CORP., LTD., Dongguan (CN)

(72) Inventor: Wu Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 402 days.

(21) Appl. No.: 17/986,659

(22) Filed: Nov. 14, 2022

(65) Prior Publication Data

US 2023/0089408 A1   Mar. 23, 2023

Related U.S. Application Data

(63) Continuation of application No. PCT/CN2021/089585, filed on Apr. 25, 2021.

(30) Foreign Application Priority Data

May 26, 2020 (CN) .......................... 202010459959.7
May 26, 2020 (CN) .......................... 202020916149.5

(51) Int. Cl.
H04B 1/04 (2006.01)
(52) U.S. Cl.
CPC ....... *H04B 1/04* (2013.01); *H04B 2001/0408* (2013.01)
(58) Field of Classification Search
None
See application file for complete search history.

(56) References Cited

U.S. PATENT DOCUMENTS

2019/0097715 A1* 3/2019 Maldonado .......... H04B 7/0814
2019/0288717 A1  9/2019 Bai
(Continued)

FOREIGN PATENT DOCUMENTS

CN      108199728 A    6/2018
CN      108390694 A    8/2018
(Continued)

OTHER PUBLICATIONS

Extended European Search Report dated Sep. 18, 2023 received in European Patent Application No. EP 21812096.2.
(Continued)

*Primary Examiner* — Suhail Khan
(74) *Attorney, Agent, or Firm* — Sheppard, Mullin, Richter & Hampton LLP

(57) ABSTRACT

Provided is a radio-frequency L-DRX device having a receiving port (RXOUT) and a polling transmitting port (SRS) used for connection to a radio-frequency transceiver, and an antenna port (ANT) for connection to an antenna. The radio-frequency L-DRX device includes: a first switching unit connected to the antenna port (ANT) and the polling transmitting port (SRS) and configured to selectively switch on a receiving path where the receiving port (RXOUT) is located and a transmitting path where the polling transmitting port (SRS) is located; a first filtering unit disposed in the receiving path or the transmitting path and configured to perform filtering processing on a received or transmitted radio-frequency signal; and a first low noise amplifier disposed in the receiving path and having an output terminal connected to the receiving port (SRS), and configured to amplify the filtered radio-frequency signal to be outputted via the receiving port (SRS).

20 Claims, 13 Drawing Sheets

(56) References Cited

U.S. PATENT DOCUMENTS

2020/0127698 A1    4/2020   Cho et al.
2021/0175940 A1    6/2021   Yang

FOREIGN PATENT DOCUMENTS

| CN | 108900234  | A  | 11/2018 |
| CN | 108923790  | A  | 11/2018 |
| CN | 110213828  | A  | 9/2019  |
| CN | 110278007  | A  | 9/2019  |
| CN | 212811690  | U  | 3/2021  |
| WO | 2019060794 | A1 | 3/2019  |
| WO | 2020019124 | A1 | 1/2020  |

OTHER PUBLICATIONS

The First Office Action from corresponding Chinese Application No. 202010459959.7 dated Aug. 26, 2024. English translation attached.
International Search Report and Written Opinion dated Jul. 22, 2021 in International Application No. PCT/CN2021/089585. English translation attached.
The Grant Notice from corresponding Chinese Application No. 202020916149.5, dated Jan. 28, 2021. English translation attached.

* cited by examiner

RADIO-FREQUENCY L-DRX DEVICE, RADIO-FREQUENCY TRANSCEIVING SYSTEM, AND COMMUNICATION APPARATUS

CROSS-REFERENCE TO RELATED APPLICATIONS

This application is a continuation of International Application No. PCT/CN2021/089585, filed on Apr. 25, 2021, which claims priorities to Chinese Patent Applications No. 202010459959.7 and No. 202020916149.5, entitled "RADIO-FREQUENCY L-DRX DEVICE, RADIO-FREQUENCY TRANSCEIVING SYSTEM, AND COMMUNICATION APPARATUS", both filed with China National Intellectual Property Administration on May 26, 2020. The disclosures of the aforementioned applications are hereby incorporated by reference in their entireties.

FIELD

The present disclosure relates to the field of radio-frequency technologies, and more particularly, to a radio-frequency L-DRX device, a radio-frequency transceiving system, and a communication apparatus.

BACKGROUND

The statements herein provide only background information relevant to the present disclosure and do not necessarily constitute exemplary related art.

With the development and advancement of technology, 5th Generation (5G) mobile communication technology has been increasingly applied to electronic devices. 5G mobile communication technology has a higher communication frequency than 4G mobile communication technology. Generally, in order to support switching between transmission and reception of radio-frequency signals, a plurality of discrete switches is provided on receiving and transmitting paths of a radio-frequency system, thereby leading to higher cost, and occupying a relatively large area of a substrate.

SUMMARY

Embodiments of the present disclosure provide a radio-frequency L-DRX device, a radio-frequency transceiving system, and a communication apparatus.

A radio-frequency L-DRX device has a receiving port and a polling transmitting port that are used for a connection to a radio-frequency transceiver, and an antenna port for a connection to an antenna. The radio-frequency L-DRX device includes a first switching unit, a first filtering unit, and a first low noise amplifier. The first switching unit is connected to the antenna port and the polling transmitting port, and the first switching unit is configured to selectively switch on a receiving path where the receiving port is located and a transmitting path where the polling transmitting port is located. The first filtering unit is disposed in the receiving path or the transmitting path, and the first filtering unit is configured to perform a filtering processing on a received or transmitted radio-frequency signal. The first low noise amplifier is disposed in the receiving path and has an output terminal connected to the receiving port, and the first low noise amplifier is configured to amplify the filtered radio-frequency signal to be outputted via the receiving port.

A radio-frequency transceiving system includes an antenna assembly, the above-mentioned radio-frequency L-DRX device, a radio-frequency Power Amplifier Modules including Duplexers (PA Mid) device, and a multi-channel selection switch. The antenna assembly at least includes a first antenna and a second antenna, and the antenna assembly is configured to transmit and receive a radio-frequency signal. The antenna port of the radio-frequency L-DRX device is connected to the first antenna. The radio-frequency PA Mid device is configured to support an amplified transceiving control of the radio-frequency signal. The multi-channel selection switch includes a first terminal connected to the radio-frequency PA Mid device, and a plurality of second terminals. One of the plurality of second terminals is connected to the second antenna, another one of the plurality of second terminals is connected to the polling transmitting port of the radio-frequency L-DRX device. The multi-channel selection switch is configured to selectively switch on a transmitting path where the first antenna is located and a transmitting path where the second antenna is located, to support a Sounding Reference Signal (SRS) function.

A communication apparatus includes: a radio-frequency transceiver; and the radio-frequency transceiving system as described above. The radio-frequency transceiving system is connected to the radio-frequency transceiver.

For the radio-frequency L-DRX device, the radio-frequency transceiving system, and the communication apparatus, the first switching unit, the first filtering unit, and the first low noise amplifier in the radio-frequency L-DRX device are integrated and packaged in the same chip, which can save an area of a substrate occupied by the respectively component. Thus, more physical space can be saved for performance optimization of other modules, and the costs can be reduced. In addition, by providing the polling transmitting port in the radio-frequency L-DRX device, the transceiving controls of radio-frequency signals can be achieved, while reducing additional power supply layouts and logic control wirings, which can be conducive to signal integrity on the substrate. In this way, mutual interference between signals can be reduced, and the difficulty in layout and wiring of the substrate can also be lowered.

One or more of the embodiments of the present disclosure are described in detail below in combination with the accompanying drawings. Other features, objects and advantages of the present disclosure will become apparent from the specification, the accompanying drawings, and the claims as attached.

BRIEF DESCRIPTION OF THE DRAWINGS

In order to clearly explain technical solutions of embodiments of the present disclosure or in the related art, drawings used in description of the embodiments or the related art will be briefly described below. The drawings described below merely illustrate some embodiments of the present disclosure. Based on these drawings, other drawings can be obtained by those skilled in the art without paying creative efforts.

DETAILED DESCRIPTION

In order to facilitate understanding of the present disclosure and to clarify the above-mentioned objects, features, and advantages of the present disclosure, specific embodiments of the present disclosure are described in detail below in conjunction with the accompanying drawings. In the following description, many specific details are provided to facilitate full understanding of the present disclosure. Preferred embodiments of the present disclosure are illustrated by means of the accompanying drawings. However, the present disclosure can be implemented in various forms and is not limited to the embodiments described herein. On the contrary, these embodiments are merely provided to facilitate thorough and comprehensive understanding of the content of the present disclosure. The present disclosure can be implemented in various manners other than those described herein, and similar improvements can be made by those skilled in the art without contradicting the intent of the present disclosure. Therefore, the present disclosure is not limited by specific embodiments disclosed below.

In addition, the term "first" or "second" is only for descriptive purposes, and it cannot be indicating or implying relative importance or implicitly indicating the number of indicated technical features. Therefore, the features defined with "first" or "second" can explicitly or implicitly include at least one of the features. In the description of the present disclosure, "plurality of" means at least two, unless otherwise specifically indicated. In the present disclosure, "a number of" means at least one, unless otherwise specifically indicated.

A radio-frequency transceiving system involved in the embodiments of the present disclosure can be applied to a communication apparatus having wireless communication capabilities. The communication apparatus may be a hand-held apparatus, a vehicle-mounted apparatus, a wearable apparatus, a computing apparatus, any other processing apparatuses connected to a wireless modem, a user equipment (UE) in various forms (e.g., a mobile phone), or a mobile station (MS), etc. For ease of description, the above-mentioned apparatuses can be collectively referred to as the communication apparatus. A network device may include a base station, an access point, etc.

Figure 1:
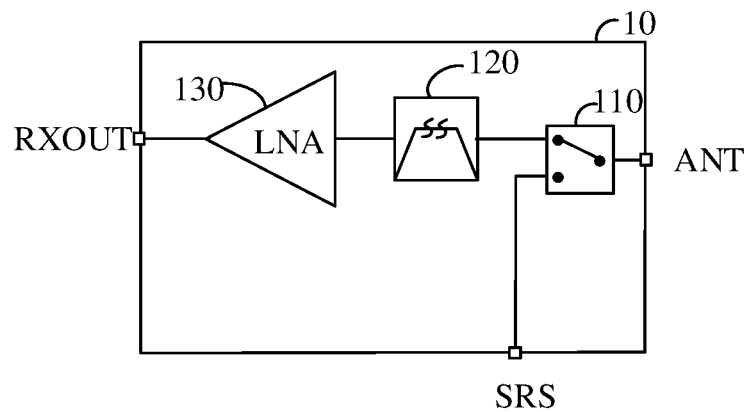
FIG. 1 is a first schematic structural diagram of a radio-frequency L-DRX device according to an embodiment.

According to an embodiment of the present disclosure, a radio-frequency L-DRX device is provided. As illustrated in FIG. 1, in an embodiment, a radio-frequency L-DRX device 10 has a receiving port RXOUT and a polling transmitting port SRS that are used for a connection to a radio-frequency transceiver, and an antenna port ANT for a connection to an antenna. The radio-frequency L-DRX device 10 can be a Low Noise Amplifier-Diversity RX. In an embodiment, the radio-frequency L-DRX device 10 is a single-band L-DRX device, which can realize transceiving control of a radio-frequency signal.

In an embodiment, the radio-frequency L-DRX device 10 can be a packaged chip. In such a device, the receiving port RXOUT, the polling transmitting port SRS, and the antenna port ANT can be radio-frequency pin terminals of the radio-frequency L-DRX device 10 for connections to various external devices. As an example, the receiving port RXOUT and the polling transmitting port SRS can be configured to connect to the radio-frequency transceiver. The antenna port ANT can be configured to connect to the antenna. For example, the antenna port ANT can input a radio-frequency signal received by the antenna to the radio-frequency L-DRX device 10, or the antenna port ANT can transmit, via the antenna, the radio-frequency signal processed by the radio-frequency L-DRX device 10. The receiving port RXOUT can process the radio-frequency signal received by the radio-frequency L-DRX device 10 via the antenna port ANT and output the processed radio-frequency signal to the radio-frequency transceiver, thereby realizing a receiving control of the radio-frequency signal. The polling transmitting port SRS can receive the radio-frequency signal outputted from the radio-frequency transceiver, thereby allowing the radio-frequency L-DRX device 10 to achieve a transmitting control of the received radio-frequency signal.

The radio-frequency signal may be a 5G signal, for example, a 5G signal in an N41 frequency band, a radio-frequency signal in an N77 (N78) frequency band, or a radio-frequency signal in an N79 frequency band, etc. As an example, an operating frequency band of N41 ranges from 496 MHz to 2,690 MHz; an operating frequency band of N77 ranges from 3.3 GHz to 4.2 GHz; an operating frequency band of N78 ranges from 3.3 GHz to 3.8 GHz; and an operating frequency band of N79 ranges from 4.4 GHz to 5.0 GHz. It should be noted that the operating frequency band of N78 is covered by the operating frequency band of N77. That is, when the radio-frequency L-DRX device 10 can support the transceiving of radio-frequency signals in the N77 frequency band, the radio-frequency L-DRX device 10 can also support the transceiving of radio-frequency signals in the N78 frequency band.

In an embodiment, the radio-frequency signal may also be a Long-Term Evolution (LTE) signal, or a WiFi signal, etc. In the embodiments of the present disclosure, the operating frequency band of the radio-frequency signal is not further limited.

In an embodiment, the radio-frequency L-DRX device 10 includes a first switching unit 110, a first filtering unit 120, and a first low noise amplifier 130. The first switching unit 110 is connected to the antenna port ANT and the polling transmitting port SRS. The first switching unit 110 is configured to transmit and receive the radio-frequency signal via the antenna port ANT. The first switching unit 110 is further configured to transmit, via the polling transmitting port SRS, the radio-frequency signal transmitted by the radio-frequency transceiver, to selectively switch on a connection of the antenna port ANT to a receiving path of the radio-frequency L-DRX device 10, or to selectively switch on a connection of the antenna port ANT to a transmitting path of the radio-frequency L-DRX device 10. The receiving path of the radio-frequency L-DRX device 10 can be a path between the antenna port ANT and the receiving port RXOUT. The transmitting path of the radio-frequency L-DRX device 10 can be a path between the antenna port ANT and the polling transmitting port SRS.

In an embodiment, referring to FIG. 1, the first filtering unit 120 may be disposed in the receiving path and configured to perform a filtering processing on the received radio-frequency signal. The first filtering unit 120 disposed in the receiving path can be that the first filtering unit 120 is disposed at a front end of the first switching unit 110 in the receiving path. That is, the first filtering unit 120 is disposed between the first switching unit 110 and the receiving port RXOUT.

Figure 2:
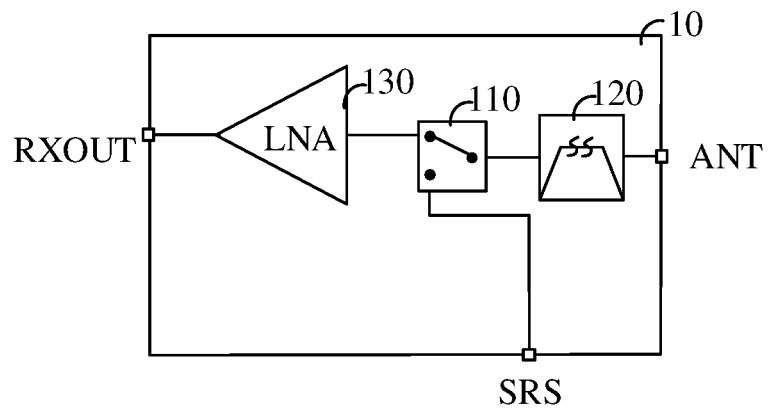
FIG. 2 is a second schematic structural diagram of a radio-frequency L-DRX device according to an embodiment.

In an embodiment, as illustrated in FIG. 2, the first filtering unit 120 may be disposed in the transmitting path and configured to perform a filtering processing on the received radio-frequency signal. The first filtering unit 120 disposed in the transmitting path may be that the first filtering unit 120 is disposed at a rear end of the first switching unit 110. That is, the first filtering unit 120 is disposed between the first switching unit 110 and the antenna port ANT.

The 3rd Generation Partnership Project (3GPP) protocol has clear requirements for spurious radiation of transmission. Filters can be used to perform a filtering processing on spurious out-of-band waves. In an embodiment of the present disclosure, for the radio-frequency L-DRX device 10 as illustrated in FIG. 1, the first filtering unit 120 according to this embodiment is disposed between the first switching unit 110 and the polling transmitting port SRS, which can not only ensure that only radio-frequency signals in a predetermined frequency band are allowed to pass through the receiving path, but also that only the radio-frequency signals in the predetermined frequency band are allowed to pass through the transmitting path. In addition, spurious waves outside of the predetermined frequency band can be filtered out.

In an embodiment, the first filtering unit 120 includes a band-pass filter or a low-pass filter. It should be noted that a type of the first filtering unit 120 can be selected based on the operating frequency band of the radio-frequency signal supportable by the radio-frequency L-DRX device 10. For example, when the radio-frequency signal supported by the radio-frequency L-DRX device 10 is a 5G signal in the N41 frequency band, the first filtering unit 120 of the radio-frequency L-DRX device 10 may be a low-pass filter, which only allows radio-frequency signals in the N41 frequency band to pass through and filters out spurious waves outside of the N41 frequency band; when the radio-frequency signal supported by the radio-frequency L-DRX device 10 is a 5G signal in the N77 frequency band, the first filtering unit 120 of the radio-frequency L-DRX device 10 may be a band-pass filter, which only allows radio-frequency signals in the N77 frequency band to pass through and filters out spurious waves outside of the N77 frequency band; and when the radio-frequency signal supported by the radio-frequency L-DRX device 10 is a 5G signal in the N79 frequency band, the first filtering unit 120 of the radio-frequency L-DRX device 10 may be a band-pass filter, which only allows radio-frequency signals in the N79 frequency band to pass through and filters out spurious waves outside of the N79 frequency band.

The first low noise amplifier 130 is disposed in the receiving path and has an output terminal connected to the receiving port RXOUT, to amplify the filtered radio-frequency signal to be outputted via the receiving port RXOUT.

It should be noted that the first filtering unit 120, the first low noise amplifier 130, and the first switching unit 110 in the radio-frequency L-DRX device 10 can all support the transceiving control of the radio-frequency signal in the predetermined frequency band. For example, the radio-frequency signal in the predetermined frequency band may be the 5G signal in the N41 frequency band, the N77 frequency band, or the N79 frequency band.

The first switching unit 110 and the first filtering unit 120 may be integrated inside the radio-frequency L-DRX device 10, to improve an integration level of the radio-frequency L-DRX device 10 and save resources of the substrate (e.g., a Printed Circuit Board (PCB) board) occupied by the first switching unit 110 and the first filtering unit 120. In addition, by providing the polling transmitting port SRS on the radio-frequency L-DRX device 10 and connecting the first switching unit 110 to the polling transmitting port SRS, the radio-frequency L-DRX device 10 has a function of simultaneously controlling the reception and transmission of the radio-frequency signal. In this way, the power supply, logic control, and PCB layout and wiring of the radio-frequency L-DRX device 10 can be simplified, thereby saving the costs.

In an embodiment, the first switching unit 110 includes a control terminal and a plurality of selection terminals. The control terminal is connected to the antenna port ANT. One of the plurality of selection terminals is connected to the polling transmitting port SRS. When the first filtering unit 120 is disposed in the receiving path, one selection terminal of the first switching unit 110 is connected to the first filtering unit 120. That is, one terminal of the first filtering unit 120 is connected to an input terminal of the first low noise amplifier 130, and the other terminal of the first filtering unit 120 is connected to one selection terminal of the first switching unit 110, to perform a filtering processing on the radio-frequency signal received in the receiving path.

As an example, the first switching unit 110 may be a radio-frequency single pole double throw (SPDT) switch. That is, a control terminal of the radio-frequency SPDT switch is connected to the antenna port ANT, a first selection terminal of the radio-frequency SPDT switch is connected to the first filtering unit 120, and a second selection terminal of the radio-frequency SPDT switch is connected to the polling transmitting port SRS, to selectively switch on the receiving path and the transmitting path of the radio-frequency L-DRX device 10.

For example, the transceiving control of the radio-frequency signal of the radio-frequency L-DRX device 10 is described by taking the first switching unit 110 being the radio-frequency SPDT switch as an example.

Receiving control: the radio-frequency signal received by the antenna is received via the antenna port ANT. That is, the radio-frequency signal enters the radio-frequency SPDT switch via the antenna port ANT. The radio-frequency SPDT switch is switched to the selection terminal connected to the first filtering unit 120 to switch on the receiving path. The radio-frequency signal is transmitted to the receiving port RXOUT via the first low noise amplifier 130. The radio-frequency signal received by the receiving port RXOUT is outputted to the radio-frequency transceiver to complete the receiving control of the radio-frequency signal.

Transmitting control: when the radio-frequency L-DRX device 10 needs to transmit SRS polling transmission, the radio-frequency signal outputted by the radio-frequency transceiver is received via the polling transmitting port SRS. That is, the radio-frequency signal is inputted to the radio-frequency SPDT switch via the polling transmitting port SRS. The radio-frequency SPDT switch is switched to the selection terminal connected to the polling transmitting port SRS to switch on the transmitting path (also referred to as an SRS path). The radio-frequency signal is radiated out by the antenna via the antenna port ANT to complete the transmitting control of the radio-frequency signal.

Referring to FIG. 2, in an embodiment, the first filtering unit 120 may be disposed in the transmitting path. That is, the first filtering unit 120 is disposed at the rear end of the first switching unit 110. The control terminal of the first switching unit 110 is connected to the antenna port ANT via the first filtering unit 120. One selection terminal of the first switching unit 110 is connected to the polling transmitting port SRS. One selection terminal of the first switching unit 110 is connected to the input terminal of the first low noise amplifier 130. One terminal of the first filtering unit 120 is connected to the control terminal of the first switching unit 110, and the other terminal of the first filtering unit 120 is connected to the antenna port ANT. That is, the first filtering unit 120 is disposed between the first switching unit 110 and the antenna port ANT, and thus the radio-frequency signal transmitted in the receiving and transmitting paths can be filtered, thereby improving out-band suppression capability of the transmitting path. Thus, the transmission performance of both the transmitting path and the receiving path can be balanced.

For example, the transceiving control of the radio-frequency signal of the radio-frequency L-DRX device 10 is described by taking the first switching unit 110 being the radio-frequency SPDT switch as an example.

Reception control: the radio-frequency signal is inputted to the radio-frequency L-DRX device 10 via the antenna port ANT and transmitted to the radio-frequency SPDT switch via a first filter. The radio-frequency SPDT switch is switched to the selection terminal connected to the first low noise amplifier 130 to switch on the receiving path. The radio-frequency signal is transmitted to the receiving port RXOUT via the first low noise amplifier 130. The received radio-frequency signal is outputted to the radio-frequency transceiver to complete the receiving control of the radio-frequency signal.

Transmission control: when the radio-frequency L-DRX device 10 needs to transmit SRS polling transmission, the radio-frequency signal outputted by the radio-frequency transceiver is received via the polling transmitting port SRS. That is, the radio-frequency signal is inputted to the radio-frequency SPDT switch via the polling transmitting port SRS. The radio-frequency SPDT switch is switched to the selection terminal connected to the first filtering unit 120 to switch on the transmitting path (also referred to as an SRS path). The radio-frequency signal is transmitted to the antenna port ANT via the first filtering unit 120, and is radiated out via the antenna. In this way, the transmitting control of the radio-frequency signal is completed.

In the radio-frequency L-DRX device 10 according to the above embodiments, the first switching unit 110, the first filtering unit 120, and the first low noise amplifier 130 are integrated and packaged in the same chip, which can save an area of a substrate occupied by the respectively component. For example, at least a total area of 21 mm² can be saved. Thus, more physical space can be saved for performance optimization of other modules, and the costs can be reduced. In addition, by providing the polling transmitting port in the radio-frequency L-DRX device 10, the transceiving controls of radio-frequency signals can be achieved, while reducing additional power supply layouts and logic control wirings, which can be conducive to signal integrity on the substrate. In this way, mutual interference between signals can be reduced, and the difficulty in layout and wiring of the substrate can also be lowered. Further, by disposing the first filter at the rear end of the first switching unit 110, the out-band suppression capability of the transmitting path can be improved, and the transmission performance of both the transmitting path and the receiving path can be balanced.

Figure 3A:
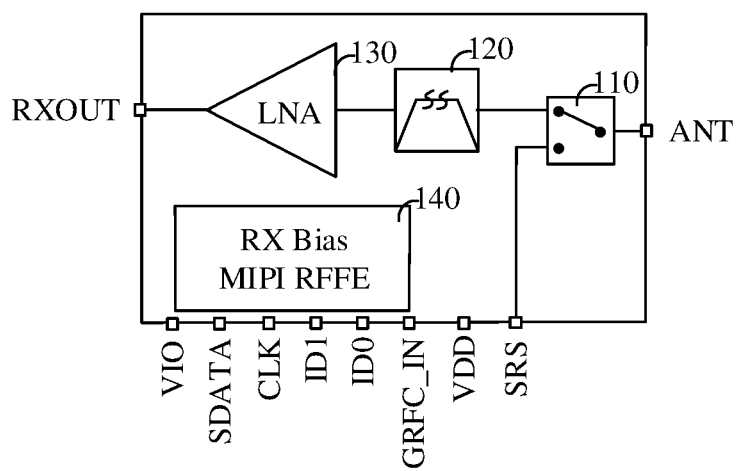
FIG. 3A is a third schematic structural diagram of a radio-frequency L-DRX device according to an embodiment.
Figure 3B:
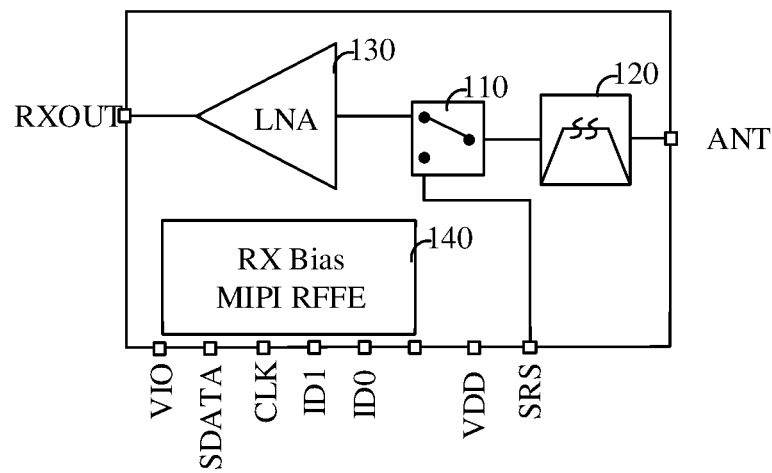
FIG. 3B is a fourth schematic structural diagram of a radio-frequency L-DRX device according to an embodiment.

As illustrated in FIG. 3A and FIG. 3B, in an embodiment, the radio-frequency L-DRX device 10 further includes a control unit 140 connected to the first low noise amplifier 130 and the first switching unit 110. The control unit 140 is configured to adjust a gain coefficient of the first low noise amplifier 130 to reduce a link loss of the receiving path, and the control unit 140 is further configured to control the first switching unit 110 to selectively switch on the receiving path or the transmitting path.

As an example, the control unit 140 may be a Mobile Industry Processor Interface (MIPI)-Radio Frequency Front End Control Interface (RFFE) unit. When the control unit 140 is the MIPI-RFFE control unit, the radio-frequency L-DRX device 10 further has an input pin CLK for clock signals, an input or bidirectional pin SDATAS for single/bidirectional data signals, a power pin VDD, a reference voltage pin VIO, etc.

For example, the MIPI-RFFE control unit can output clock and data signals to corresponding pins of the radio-frequency SPDT switch, to control the switching-on or switching-off of the receiving path or the transmitting path. Accordingly, the MIPI-RFFE control unit can output clock and data signals to corresponding pins of the first low noise amplifier 130 to achieve gain adjustment control of the first low noise amplifier 130.

Figure 4:
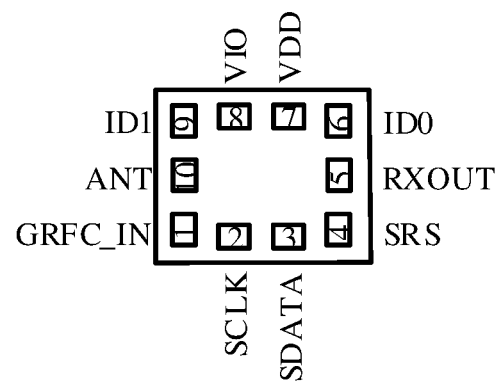
FIG. 4 is a schematic diagram of a packaged pin of a radio-frequency L-DRX device according to an embodiment.
Figure 5:
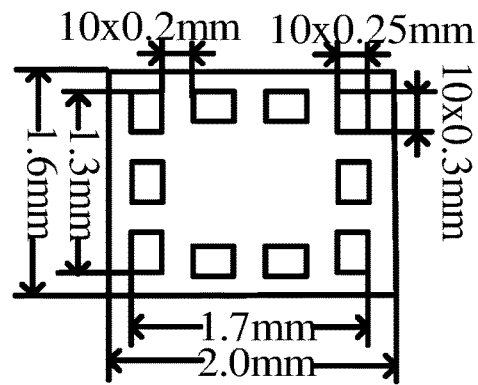
FIG. 5 is a schematic diagram of a package structure of a radio-frequency L-DRX device according to an embodiment.

In an embodiment, the respective components included in the radio-frequency L-DRX device 10 can be integrated in the same chip through a packaging process, as illustrated in FIG. 4. The respective pins in the chip correspond to a plurality of ports provided in the radio-frequency L-DRX device 10 in one-to-one correspondence, and they are integrated through packaging, as illustrated in FIG. 5. In this way, the integration level of the radio-frequency L-DRX device 10 can be improved.

According to an embodiment of the present disclosure, the first switching unit 110 may also be an electronic switching tube, a MIPI interface switch and/or a General-purpose input/output (GPIO) interface switch, or other switching units that can be integrated in the radio-frequency L-DRX device 10. A type of the control unit 140 can be determined according to a type of the first switching unit 110, for example, the control unit 140 may be a GPIO control unit, etc. It should be noted that the type of the first switching unit 110 or the type of the control unit 140 is not limited in the embodiments of the present disclosure.

It should be noted that the radio-frequency L-DRX device 10 provided by the embodiments of the present disclosure can support a transceiving control of a 5G signal in the N41, N77, or N79 frequency band.

Figure 6A:
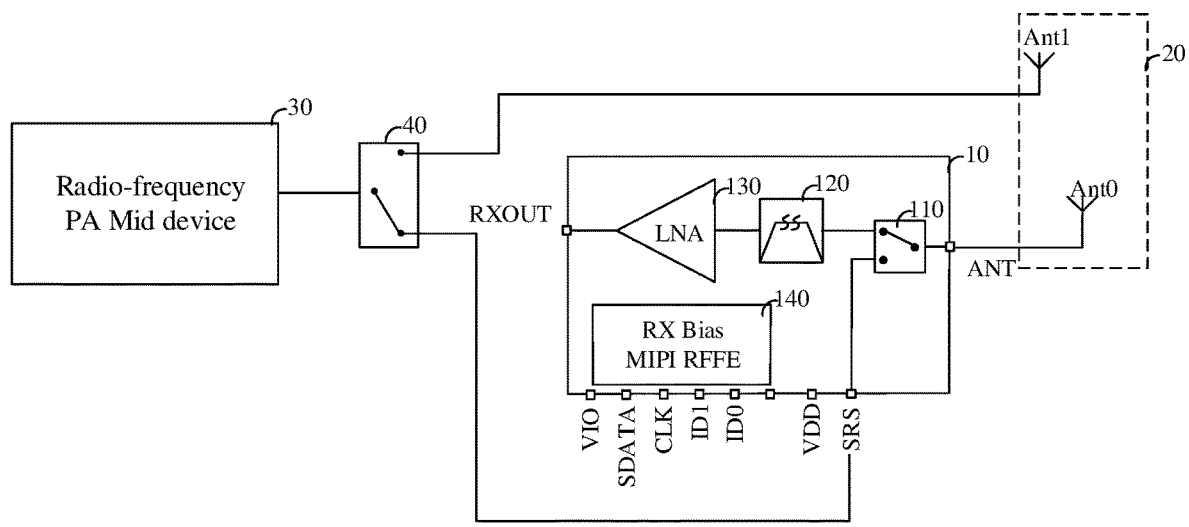
FIG. 6A is a first schematic structural diagram of a radio-frequency transceiving system according to an embodiment.
Figure 6B:
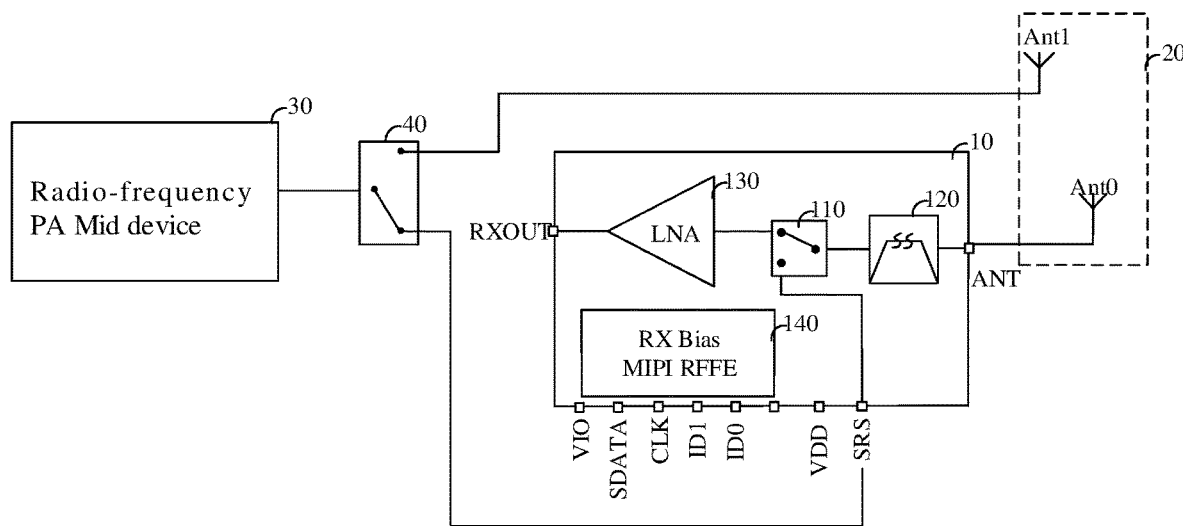
FIG. 6B is a second schematic structural diagram of a radio-frequency transceiving system according to an embodiment.

The embodiments of the present disclosure further provide a radio-frequency transceiving system. As illustrated in FIG. 6A and FIG. 6B, in an embodiment, the radio-frequency transceiving system includes an antenna assembly 20, a radio-frequency PA Mid device 30, a multi-channel selection switch 40, and the radio-frequency L-DRX device 10 according to any of the above embodiments.

In an embodiment, the antenna assembly 20 at least includes a first antenna Ant0 and a second antenna Ant1. The first antenna Ant0 and the second antenna Ant1 can both support the radio-frequency signals in different operating frequency bands, e.g., LTE signals, WiFi signals, 5G New Radio (NR) signals, etc. The first antenna Ant0 can be configured to receive and transmit (i.e., transceive) radio-frequency signals in different frequency bands. The second antenna Ant1 can be configured to transceive radio-frequency signals in different frequency bands.

In an embodiment, the first antenna Ant0 and the second antenna Ant1 may be directional or non-directional antennas. For example, the first antenna Ant0 and the second antenna Ant1 may be formed by any suitable type of antenna. For example, the first antenna Ant0 and the second antenna Ant1 may include an antenna having a resonant element and formed by at least one of the following antenna structures: an array antenna structure, a loop antenna structure, a patch antenna structure, a slot antenna structure, a spiral antenna structure, a strip antenna, a monopole antenna, a dipole antenna, or the like. Different types of antennas can be used for combinations of frequency bands of different radio-frequency signals.

The antenna assembly 20 may further include a third antenna and a fourth antenna. In the embodiments of the present disclosure, the number and type of antennas included in the antenna assembly 20 are not limited and can be determined as desired.

The radio-frequency PA Mid device 30 is configured to support an amplified transceiving control of the radio-frequency signal. That is, the radio-frequency PA Mid device 30 can realize the receiving and transmitting control of individual radio-frequency signals. For example, the radio-frequency PA Mid device 30 may also be a packaged chip. The radio-frequency PA Mid device 30 has a receiving path for receiving the radio-frequency signal and a transmitting path for transmitting the radio-frequency signal, to achieve the transceiving control of the radio-frequency signal.

The antenna port ANT of the radio-frequency L-DRX device 10 is connected to the first antenna Ant0. When the radio-frequency L-DRX device 10 is connected to the first antenna Ant0, both the receiving control of the radio-frequency signal received by the first antenna Ant0 and the transmitting control of the radio-frequency signal can be realized by controlling switching of the switching unit 110. The radio-frequency signal is outputted via the first antenna Ant0.

The multi-channel selection switch 40 includes a first terminal and a plurality of second terminals. The first terminal is connected to the radio-frequency PA Mid device 30. One second terminal is connected to the second antenna Ant1, and another second terminal is connected to the polling transmitting port SRS of the radio-frequency L-DRX device 10. The multi-channel selection switch 40 is configured to support an SRS function by selectively switching on a transmitting path where the first antenna Ant0 and a transmitting path where the second antenna Ant1 is located.

It should be noted that the number of the second terminals of the multi-channel selection switch 40 can be determined based on the number of antennas included in the antenna assembly 20. As an example, when the antenna assembly 20 contains two antennas, the multi-channel selection switch 40 has two second terminals, and the multi-channel selection switch 40 may be, for example, the radio-frequency SPDT switch. As another example, when the antenna assembly 20 contains four antennas, the multi-channel selection switch 40 has four second terminals, and the multi-channel selection switch 40 may be, for example, the radio-frequency SP4T switch.

In the radio-frequency system according to the above embodiments, the polling transmitting port SRS and the first switching unit 110 that are provided in the radio-frequency L-DRX device 10, along with the multi-channel selection switch 40, can achieve a polling transmission of the radio-frequency signal between the first antenna Ant0 and the second antenna Ant1. In addition, dual-channel reception of two radio-frequency signals received by the first antenna Ant0 and the second antenna Ant1 can also be realized based on the receiving path of the radio-frequency L-DRX device 10 and the receiving path of the radio-frequency PA Mid device 30. Further, in the radio-frequency system according to the embodiments of the present disclosure, the polling transmission of the radio-frequency signal between the first antenna Ant0 and the second antenna Ant1 can be realized by packaging the radio-frequency L-DRX device 10, the radio-frequency PA Mid device 30, and the multi-channel selection switch 20, without providing a plurality of independent cascade switches. In this way, the costs can be lowered, and an area of the substrate occupied by different components in the radio-frequency system can be reduced.

Figure 7:
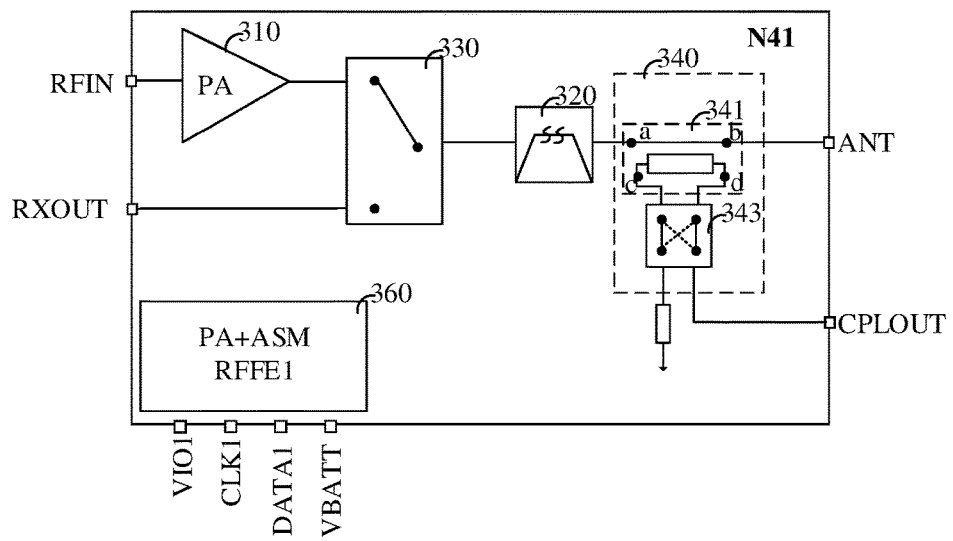
FIG. 7 is a first schematic structural diagram of a radio-frequency Power Amplifier Modules including Duplexers (PA Mid) device according to an embodiment.

As illustrated in FIG. 7, in an embodiment, the radio-frequency PA Mid device 30 has a radio-frequency transmitting port RFIN, a radio-frequency receiving port RXOUT, and a radio-frequency antenna port ANT. The radio-frequency PA Mid device 30 may be a packaged chip. The radio-frequency transmitting port RFIN, the radio-frequency receiving port RXOUT, and the radio-frequency antenna port ANT may be radio-frequency pin terminals of the radio-frequency PA Mid device 30 for a connection to external devices. As an example, the radio-frequency transmitting port RFIN and the radio-frequency receiving port RXOUT can be configured to connect to the radio-frequency transceiver. The radio-frequency antenna port ANT can be configured to connect to the first antenna Ant0.

For example, the radio-frequency antenna port ANT can input the radio-frequency signal received by the first antenna Ant0 to the radio-frequency PA Mid device 30, or it can transmit the radio-frequency signal processed by the radio-frequency PA Mid device 30 via the first antenna Ant0. The radio-frequency receiving port RXOUT can process the radio-frequency signal, which is received by the radio-frequency PA Mid device 30 via the radio-frequency antenna port ANT. The radio-frequency receiving port RXOUT can transmit the processed radio-frequency signal to the radio-frequency transceiver, to achieve the receiving control of the radio-frequency signal. The radio-frequency transmitting port can receive the radio-frequency signal outputted from the radio-frequency transceiver, thereby allowing the radio-frequency PA Mid device 30 to realize the transmitting control of the received radio-frequency signal.

In an embodiment, the radio-frequency PA Mid device 30 includes a power amplifier 310, a second filtering unit 320, and a second switching unit 330.

The power amplifier 310 has an input terminal connected to the radio-frequency transmitting port RFIN. The power amplifier 310 is configured to receive the radio-frequency signal transmitted by the radio-frequency transceiver and perform a power amplification processing on the radio-frequency signal. The second filtering unit 320 is connected to the radio-frequency antenna port ANT and configured to perform a filtering processing on the received radio-frequency signal. The second switching unit 330 is connected to an output terminal of the power amplifier 310, the radio-frequency receiving port RXOUT, and the second filtering unit. The receiving path of the radio-frequency PA Mid device 30 may be a path between the radio-frequency antenna port ANT and the radio-frequency receiving port RXOUT. The transmitting path of the radio-frequency PA Mid device 30 may be a path between the radio-frequency antenna port ANT and the radio-frequency transmitting port RFIN.

In an embodiment, the second filtering unit 320 includes a low-pass filter or a band-pass filter. It should be noted that a type of the second filtering unit 320 can be selected based on the operating frequency band of the radio-frequency signal supportable by the radio-frequency PA Mid device 30. For example, a type of the second filtering unit 320 may be the same as that of the first filtering unit 120, both of which can realize filtering of the radio-frequency signals transmitted and received by the radio-frequency system.

The second switching unit 330 can be configured to selectively switch on a receiving path where the radio-frequency receiving port RXOUT is located and a transmitting path where the radio-frequency transmitting port RFIN is located. As an example, the second switching unit 330 may be a radio-frequency SPDT switch. That is, the radio-frequency SPDT switch has a control terminal connected to the second filtering unit 320, a first selection terminal connected to the radio-frequency receiving port RXOUT, and a second selection terminal connected to the output terminal of the power amplifier 310, to selectively switch on the receiving path and the transmitting path of the radio-frequency PA Mid device 30.

In an embodiment, the radio-frequency PA Mid device 30 is further has a coupling output port CPLOUT, and the radio-frequency PA Mid device 30 further includes a coupling module 340. The coupling module 340 includes a coupling unit 341 and a coupling switch 343. The coupling unit 341 is configured to couple the radio-frequency signal in the transmitting path to realize a coupled output of the radio-frequency signal. In addition, the coupling unit 341 can also be configured to measure coupling power of the radio-frequency signal. As an example, the coupling unit 341 includes an input terminal a, an output terminal b, a first coupling terminal c, and a second coupling terminal d. Further, the coupling unit 341 further includes a primary line extending between the input terminal a and the output terminal b and a secondary line extending between the first coupling terminal c and the second coupling terminal d.

The input terminal a of the coupling unit 341 is connected to the second filtering unit 320. The output terminal b of the coupling unit 341 is connected to the radio-frequency antenna port ANT. The first coupling terminal c is configured to couple the radio-frequency signal received at the input terminal a and output a forward coupled signal. The second coupling terminal d is configured to couple a reflected signal of the radio-frequency signal received at the output terminal b and output a reverse coupled signal. Forward power information of the radio-frequency signal can be detected based on the forward coupled signal outputted at the first coupling terminal c. Correspondingly, reverse power information of the radio-frequency signal can be detected based on the reverse coupled signal outputted at the second coupling terminal d. Such a detection mode is defined as a reverse power detection mode.

The coupling switch 343 is connected to the first coupling terminal c, the second coupling terminal d, and the coupling output port CPLOUT. The coupling switch 343 is configured to selectively switch on a first coupling path between the first coupling terminal c and the coupling output port CPLOUT to detect forward power of the radio-frequency signal, and such a detection mode is defined as a forward power detection mode. The coupling switch 343 is also configured to switch on a second coupling path between the second coupling terminal d and the coupling output port CPLOUT to detect reverse power of the radio-frequency signal, and such a detection mode is defined as the reverse power detection mode. That is, the coupling switch 343 is configured to switch between the forward power detection mode and the reverse power detection mode. As an example, the coupling unit 341 includes two directional couplers connected in reverse series.

In this embodiment, the radio-frequency PA Mid device 30 only has one coupling output port CPLOUT. Since the radio-frequency signals in different frequency bands are not emitted simultaneously, the one coupling output port CPLOUT can meet communication requirements. In addition, by providing one coupling output port CPLOUT, the complexity of radio-frequency traces inside the radio-frequency PA Mid device 30 can be reduced, and isolation performance of each trace of the radio-frequency PA Mid device 30 can be improved.

For example, the radio-frequency SPDT switch is taken as the second switching unit 330, and the 5G signal in the N41 band is taken as the radio-frequency signal, in order to describe the transceiving control of the radio-frequency signal performed by the radio-frequency PA Mid device 30 below.

Transmitting control: the radio-frequency signal outputted from the radio-frequency transceiver is received via the radio-frequency transmitting port RFIN. That is, the radio-frequency signal is transmitted from the radio-frequency transmitting port RFIN and transmitted through the power amplifier 310 and the radio-frequency SPDT switch 310; the radio-frequency signal is transmitted to the second filtering unit 320 via the radio-frequency SPDT switch to switch on the transmitting path; and the radio-frequency signal is radiated out by the antenna after being transmitted through the second filtering unit 320, the coupling unit 341, and the radio-frequency antenna port ANT. In this way, the transmitting control of the radio-frequency signal is completed.

Receiving control: the radio-frequency signal received by the antenna is received via the radio-frequency antenna port ANT. That is, the radio-frequency signal is transmitted into the coupling unit 341 via the radio-frequency antenna port ANT and into the control terminal of the radio-frequency SPDT switch via the second filtering unit 320. The radio-frequency SPDT switch is switched to the radio-frequency receiving port RXOUT, through which the radio-frequency signal is outputted to the radio-frequency transceiver. In this way, the receiving control of the radio-frequency signal is completed.

Figure 8:
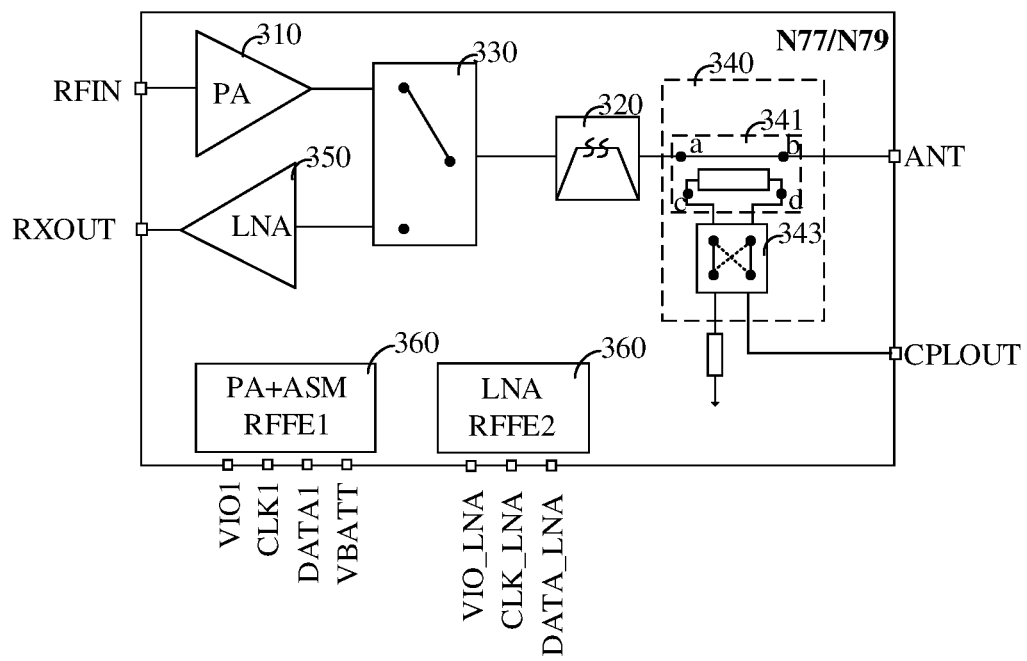
FIG. 8 is a second schematic structural diagram of a radio-frequency PA Mid device according to an embodiment.

As illustrated in FIG. 8, in an embodiment, when the radio-frequency PA Mid device 30 is configured to support the transceiving control of radio-frequency signals in the N77 or N97 frequency band, the radio-frequency PA Mid device 30 further includes a second low noise amplifier 350. The second low noise amplifier 350 has an input terminal connected to the second switching unit 330 and an output terminal connected to the radio-frequency receiving port RXOUT. The second low noise amplifier 350 is configured to amplify the radio-frequency signal in the receiving path. That is, in the receiving path of the radio-frequency PA Mid device 30, the second low noise amplifier 350 is provided to amplify the radio-frequency signal, to meet the communication requirements of the receiving path.

Figure 9A:
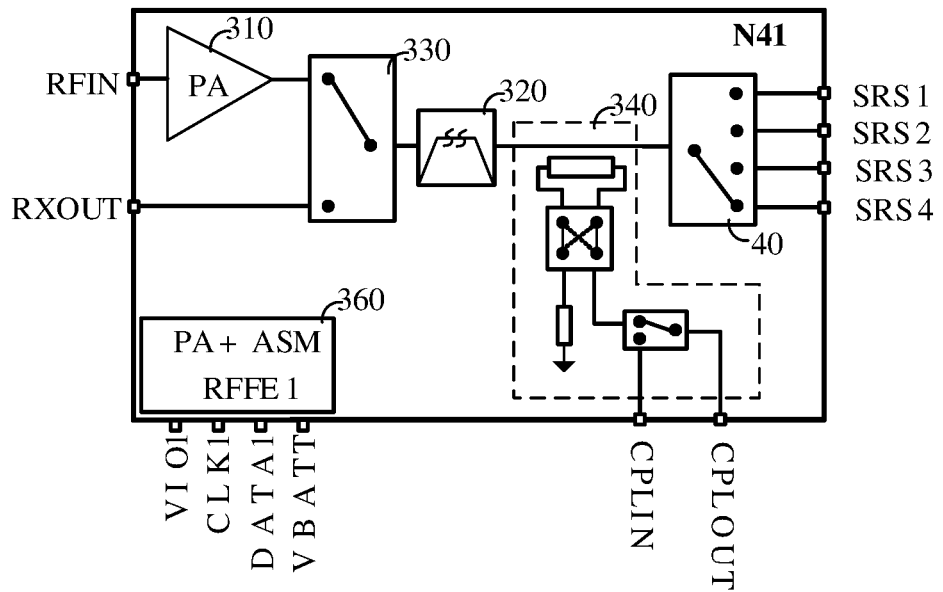
FIG. 9A is a third schematic structural diagram of a radio-frequency PA Mid device according to an embodiment.
Figure 9B:
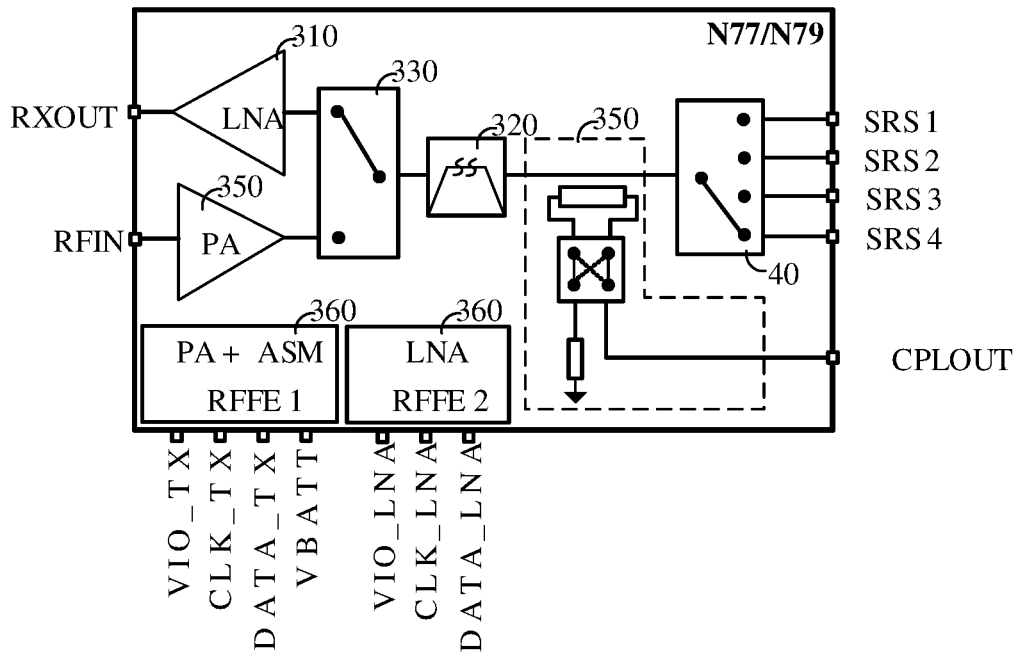
FIG. 9B is a fourth schematic structural diagram of a radio-frequency PA Mid device according to an embodiment.

As illustrated in FIG. 9A and FIG. 9B, in an embodiment, the multi-channel selection switch 40 is integrated in the radio-frequency PA Mid device 30. The integrated radio-frequency PA Mid device 30 has a plurality of radio-frequency antenna ports (SRS1 to SRS4). The plurality of second terminals of the multi-channel selection switch 40 is connected to the plurality of radio-frequency antenna ports (SRS1-SRS4) in a one-to-one correspondence.

For the purpose of explanation, as an example, the multi-channel selection switch 40 is the radio-frequency SPDT switch. The first terminal of the radio-frequency SPDT switch is connected to the output terminal of the coupling unit 341. One second terminal of the radio-frequency SPDT switch is connected to the first antenna Ant0 via the first radio-frequency antenna port SRS1, and another second terminal thereof is connected to the second antenna Ant1 via the second radio-frequency antenna port SRS2 and the polling transmitting port SRS of the radio-frequency L-DRX device 10. In this way, the polling transmission of the radio-frequency signal between the first antenna Ant0 and the second antenna Ant1 can be achieved, and the integration level of the radio-frequency PA Mid device 30 can be increased, thereby reducing the costs and the area of the substrate occupied by different components in the radio-frequency system.

In an embodiment, the radio-frequency PA Mid device 30 further includes at least one control unit 360. Referring to FIG. 7, when the radio-frequency PA Mid device 30 supports the transceiving control of radio-frequency signals in the N41 frequency band, the radio-frequency PA Mid device 30 includes one control unit 360. The control unit 360 is connected to the power amplifier 310, the second switching unit 330, and the coupling switch 343. The control unit 360 is configured to control a gain coefficient of the power amplifier 310 and control selective switching states of the first switching unit 110 and the coupling switch 343. Referring to FIG. 8, when the radio-frequency PA Mid device 30 supports the transceiving control of radio-frequency signals in the N77 or N79 frequency band, an additional control unit 360 connected to the second low noise amplifier 350 may be provided. The additional control unit 360 is configured to adjust a gain coefficient of the second low noise amplifier 350, to adjust an insertion loss of a receiving link in the radio-frequency PA Mid device 30, thereby improving sensitivity of its radio-frequency system.

With the development and advancement of technology, 5G mobile communication technology has been increasingly applied to communication apparatuses. A 5G network supports beam-shaping technology, which allows directional transmission to communication apparatuses. In order to realize the directional transmission, a base station first needs to detect a position of a communication apparatus, a quality of a transmitting path, etc., to allocate resources of the base station to each communication apparatus more accurately.

Figure 10A:
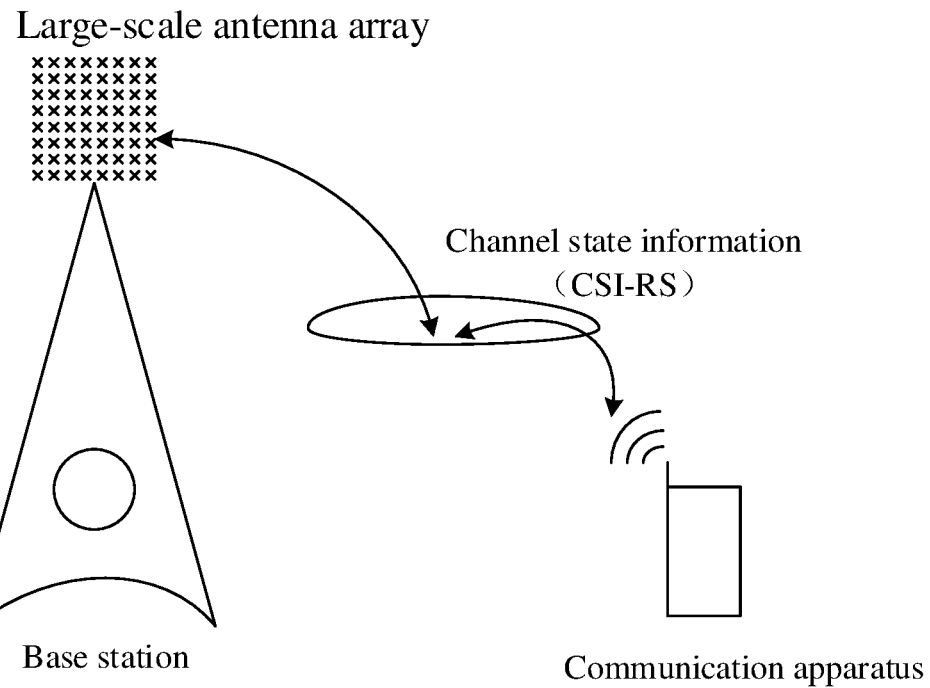
FIG. 10A is a first schematic diagram of an application scenario for a feedback channel information transmission of a communication apparatus according to an embodiment.
Figure 10B:
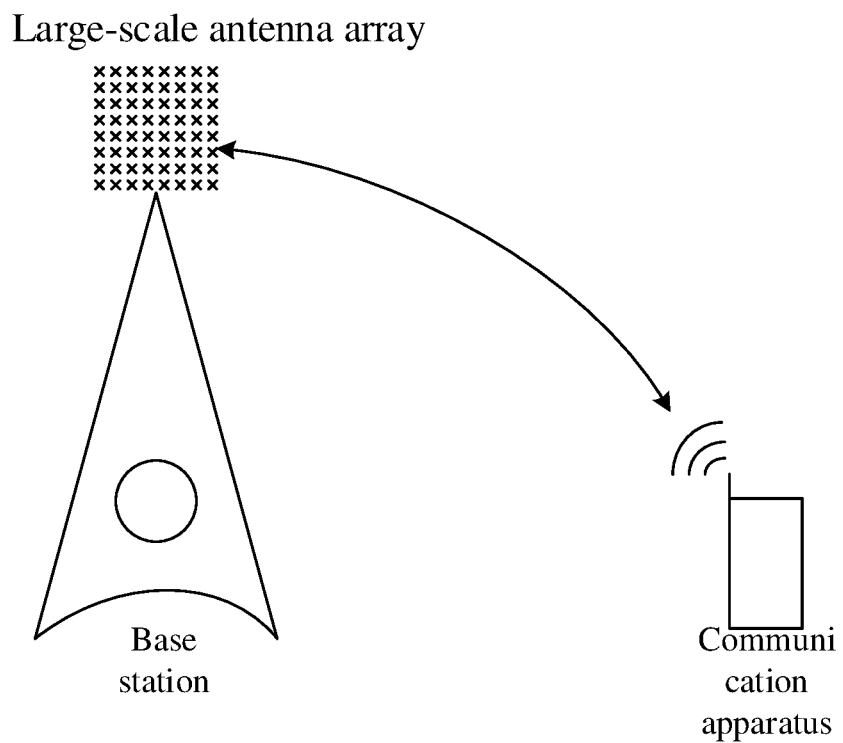
FIG. 10B is a second schematic diagram of an application scenario for a feedback channel information transmission of a communication apparatus according to an embodiment.

Currently, the communication apparatus provides feedback of channel information in two different modes: Pre-coding Matrix Indicator (PMI) and Sounding Reference Signal (SRS), signal transmissions of which are as illustrated in FIG. 10A and FIG. 10B, respectively. By standard definition, PMI is a mandatory function for all 5G communication apparatuses, while SRS is an optional function. In PMI, relying on a measurement of a terminal and various quantization algorithms, the base station estimates channel information and resource requirements in accordance with a pre-determined mechanism, and reports the channel information and the resource requirements to the base station. In SRS, the channel information is directly reported to the base station through channel reciprocity. Obviously, SRS is more accurate than PMI.

Figure 11:
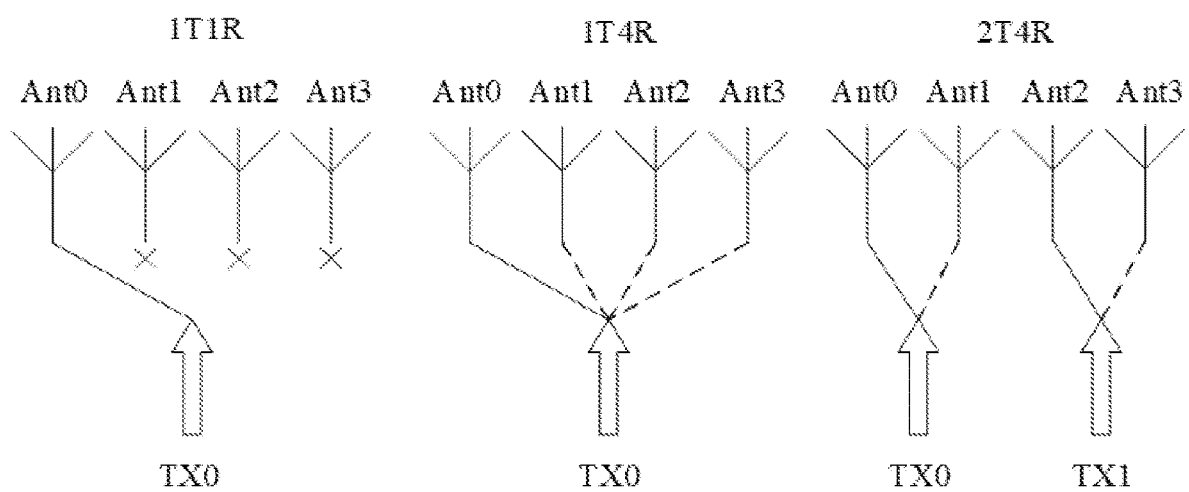
FIG. 11 is a schematic structural diagram of a mode of a Sounding Reference Signal (SRS) antenna polling transmission according to an embodiment.

The base station can detect a position of the terminal and a channel quality by transmitting SRS information by the communication apparatus. SRS antenna polling transmission is as illustrated in FIG. 11 and explained in detail below.

1T1R: only feeding back information to the base station at the first antenna Ant0, not supporting the SRS polling transmission.

1T4R: transmitting SRS information in turn at the first antenna Ant0 to a fourth antenna Ant3, where only one antenna is selected for transmission each time. Currently, Non-Standalone (NSA) networks adopt this mode.

2T4R: transmitting SRS information in turn at the first antenna Ant0 to the fourth antenna Ant3, where two antennas are selected for transmission each time. Currently, Standalone (SA) networks adopt this mode.

In an SRS mode, with an increase in the number of antennas that can participate in transmitting a reference signal, the channel estimation can be more accurate, and the corresponding rate can be higher. Under the same number of antennas, an SA mode can complete the channel estimation faster than an NSA mode, increasing a network channel estimation speed.

Currently, all major operators have put forward the functional requirements for 5G NR to support SRS. For example, China Mobile has clearly stated in its White Paper for 5G Terminal Products that, N41/79 must support SRS function (1T2R or 2T4R); China Unicorn has clearly requested in its White Paper for 5G Terminals that N78 must support SRS 1T4R and 2T4R antenna polling transmission; and China Telecom proposed in its Requirements White Paper for 5G All-modes Terminals that 1-port and 2-port SRS transmission and antenna switching need to be supported and it is recommended to support quad-antenna polling transmission in the n78 frequency band, i.e., SRS 1T4R and 2T4R.

Figure 12A:
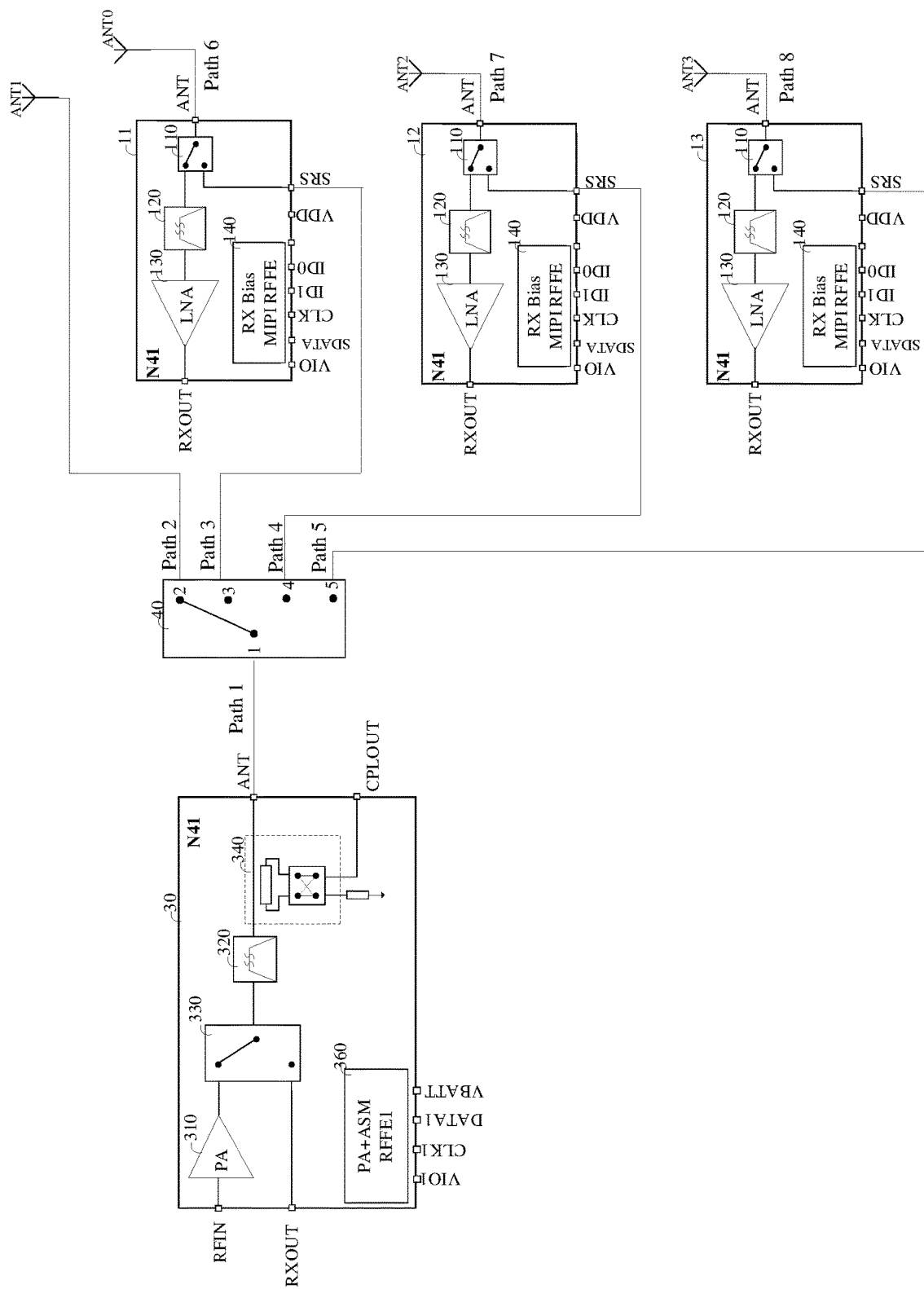
FIG. 12A is a third schematic structural diagram of a radio-frequency transceiving system according to an embodiment.
Figure 12B:
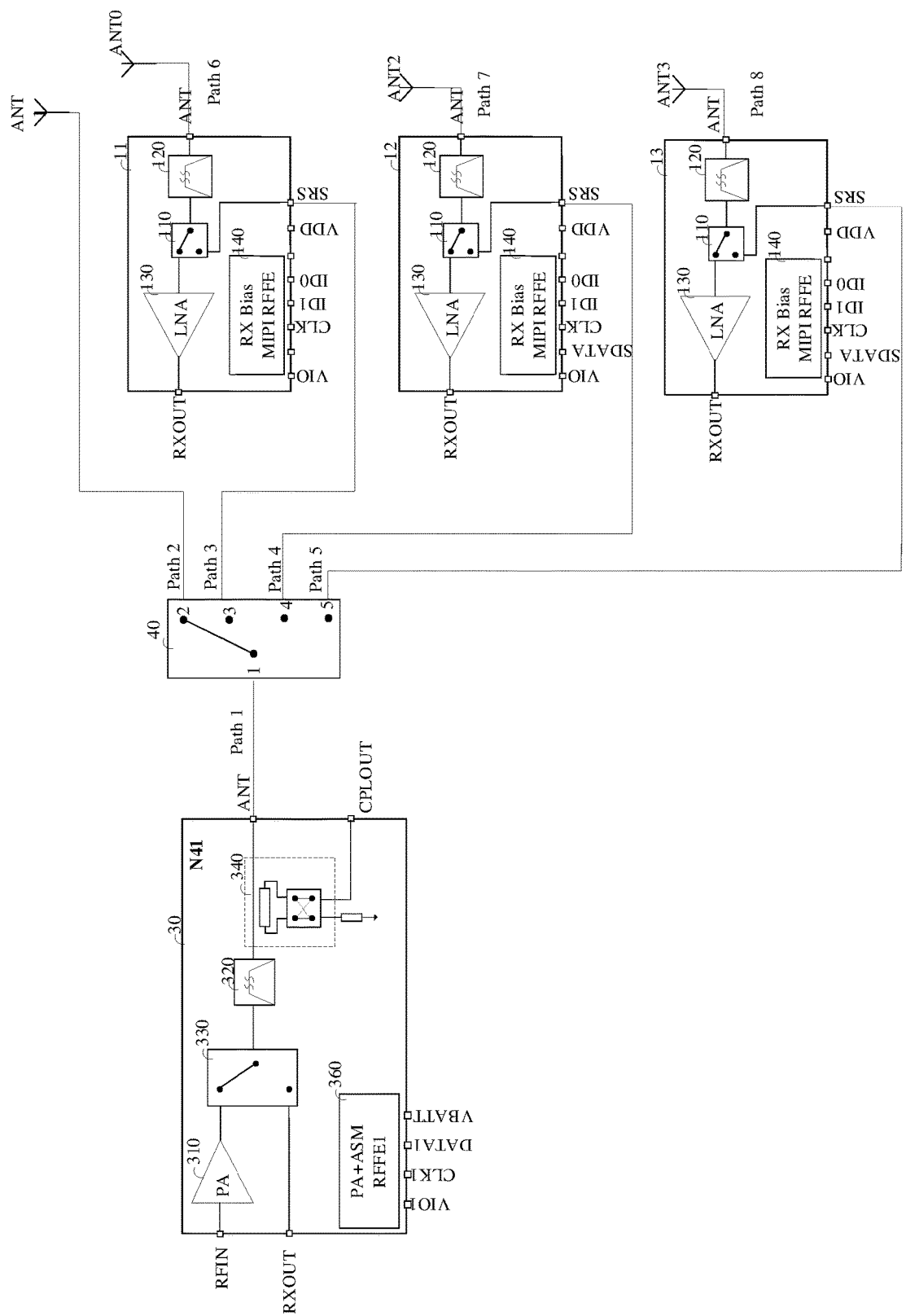
FIG. 12B is a fourth schematic structural diagram of a radio-frequency transceiving system according to an embodiment.

As illustrated in FIG. 12A and FIG. 12B, in an embodiment, the antenna assembly 20 includes the first antenna Ant0, the second antenna Ant1, a third antenna Ant2, and the fourth antenna Ant3, and three radio-frequency L-DRX devices 10 are provided. Three radio-frequency L-DRX devices 10 are provided and are respectively defined as a first radio-frequency L-DRX device 11, a second radio-frequency L-DRX device 12, and a third radio-frequency L-DRX device 13. The first radio-frequency L-DRX device 11, the second radio-frequency L-DRX device 12, and the third radio-frequency L-DRX device 13 are the same. The first filtering unit 120 in each radio-frequency L-DRX device 10 is disposed at the front end of the first switching unit 110.

Referring to FIG. 12B, in an embodiment, the first filtering unit 120 in each of the first radio-frequency L-DRX device 11, the second radio-frequency L-DRX device 12, and the third radio-frequency L-DRX device 13 is disposed at the rear end of the first switching unit 110.

The first terminal of the multi-channel selection switch 40 is connected to the radio-frequency PA Mid device 30. One second terminal of the multi-channel selection switch 40 is connected to the second antenna Ant1. Another second terminal thereof is connected to the first antenna Ant0 via a polling transmitting port SRS of the first radio-frequency L-DRX device 11. Yet another second terminal thereof is connected to the third antenna Ant2 via a polling transmitting port SRS of the second radio-frequency L-DRX device 12. Still yet another second terminal thereof is connected to the fourth antenna Ant3 via a polling transmitting port SRS of the third radio-frequency L-DRX device 13. In this way, the 1T4R SRS function can be supported.

In an embodiment, the multi-channel selection switch 40 and the radio-frequency PA Mid devices 30 are disposed discretely, and the multi-channel selection switch 40 is the radio-frequency SP4T switch. The first terminal (contact 1) of the radio-frequency SP4T switch is connected to the radio-frequency antenna port ANT of the radio-frequency PA Mid device 30. One second terminal (contact 2) of the radio-frequency SP4T switch is connected to the second antenna Ant1. Another second terminal (contact 3) of the radio-frequency SP4T switch is connected to the first antenna Ant0 via the polling transmitting port SRS of the first radio-frequency L-DRX device 11. Yet another second terminal (contact 4) of the radio-frequency SP4T switch is connected to the third antenna Ant2 via the polling transmitting port SRS of the second radio-frequency L-DRX device 12. Still yet another second terminal (contact 5) of the radio-frequency SP4T switch is connected to the fourth antenna Ant3 via the polling transmitting port SRS of the third radio-frequency L-DRX device 13. In this way, the 1T4R SRS function can be supported.

The radio-frequency system according to this embodiment can support the quad-antenna 1T4R SRS function. For example, operation principles of SRS in the N41 frequency band are analyzed by taking FIG. 12B as an example.

The radio-frequency signal is outputted from the radio-frequency antenna port ANT of the radio-frequency PA Mid device 30 after being transmitted through the radio-frequency transmitting port RFIN of the radio-frequency PA Mid device 30, the power amplifier 310, the second switching unit 330, the second filtering unit 320, and the coupling unit 341. In one case, the radio-frequency signal is transmitted to the radio-frequency SP4T switch via path 1; the radio-frequency SP4T is switched to path 2; and the radio-frequency signal is outputted from the second antenna Ant1. In another case, the radio-frequency signal is transmitted to the radio-frequency SP4T switch via path 1; the radio-frequency SP4T is switched to path 3; and the radio-frequency signal is outputted from the first antenna Ant0 by switching to path 6 via the polling transmission port SRS of the first radio-frequency L-DRX device 11. In yet another case, the radio-frequency signal is transmitted to the radio-frequency SP4T switch via path 1; the radio-frequency SP4T is switched to path 4; and the radio-frequency signal is outputted from the third antenna Ant2 by switching to path 7 via the polling transmission port SRS of the first radio-frequency L-DRX device 12. In still yet another case, the radio-frequency signal is transmitted to the radio-frequency SP4T switch via path 1; the radio-frequency SP4T is switched to path 5; and the radio-frequency signal is outputted from the fourth antenna Ant3 by switching to path 8 via the polling transmission port SRS of the first radio-frequency L-DRX device 13.

SRS functions of N77 and N79 transmissions are similar as that of N41, which are not described in detail herein. Specific path configurations for 1T4R SRS are shown in Table 1.

TABLE 1

| Detailed path configurations for 1T4R SRS | | | |
|---|---|---|---|
| | N41 | N77 | N79 |
| Channel 0 | Path 1->Path 2 | Path 1->Path 2 | Path 1->Path 2 |
| Channel 1 | Path 1->Path 3->Path 6 | Path 1->Path 3->Path 6 | Path 1->Path 3->Path 6 |
| Channel 2 | Path 1->Path 4->Path 7 | Path 1->Path 4->Path 7 | Path 1->Path 4->Path 7 |
| Channel 3 | Path 1->Path 5->Path 8 | Path 1->Path 5->Path 8 | Path 1->Path 5->Path 8 |

In Table 1, Channel 0, Channel 1, Channel 2, and Channel 3 are transmitting paths for polling transmission of the antennas.

Figure 13A:
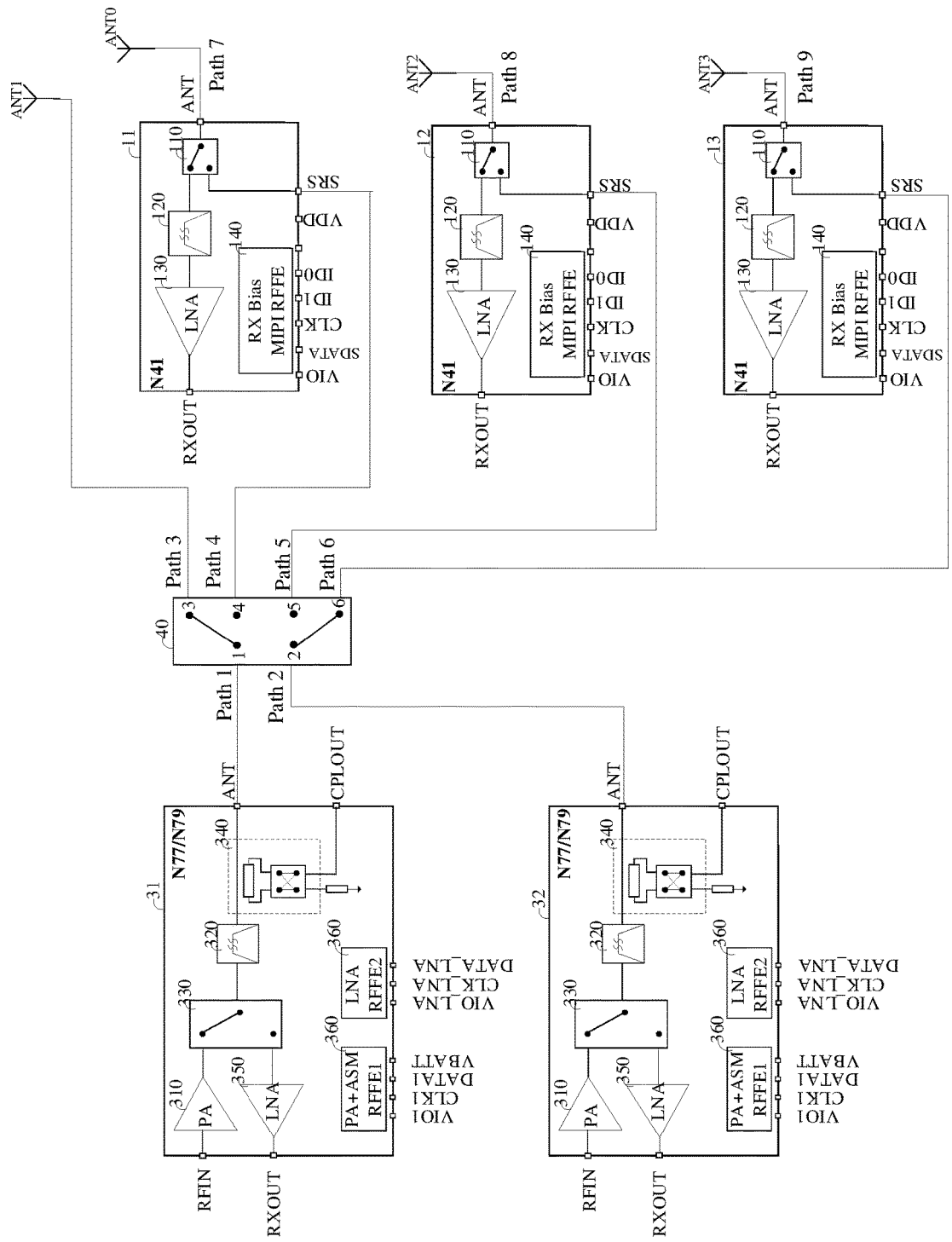
FIG. 13A is a fifth schematic structural diagram of a radio-frequency transceiving system according to an embodiment.

As illustrated in FIG. 13A, in an embodiment, the antenna assembly 20 includes a first antenna Ant0, a second antenna Ant1, a third antenna Ant2 and the fourth antenna Ant3. Two radio-frequency PA Mid devices 30 are provided and defined as a first radio-frequency PA Mid device 31 and a second radio-frequency PA Mid device 32, respectively. Three radio-frequency L-DRX devices 10 are provided and defined as the first radio-frequency L-DRX device 11, the second radio-frequency L-DRX device 12, the third radio-frequency L-DRX device 13, respectively.

The first radio-frequency L-DRX device 11, the second radio-frequency L-DRX device 12, and the third radio-frequency L-DRX device 13 are the same. The first filtering unit 120 in each radio-frequency L-DRX device 10 is disposed at the front end of the first switching unit 110.

Figure 13B:
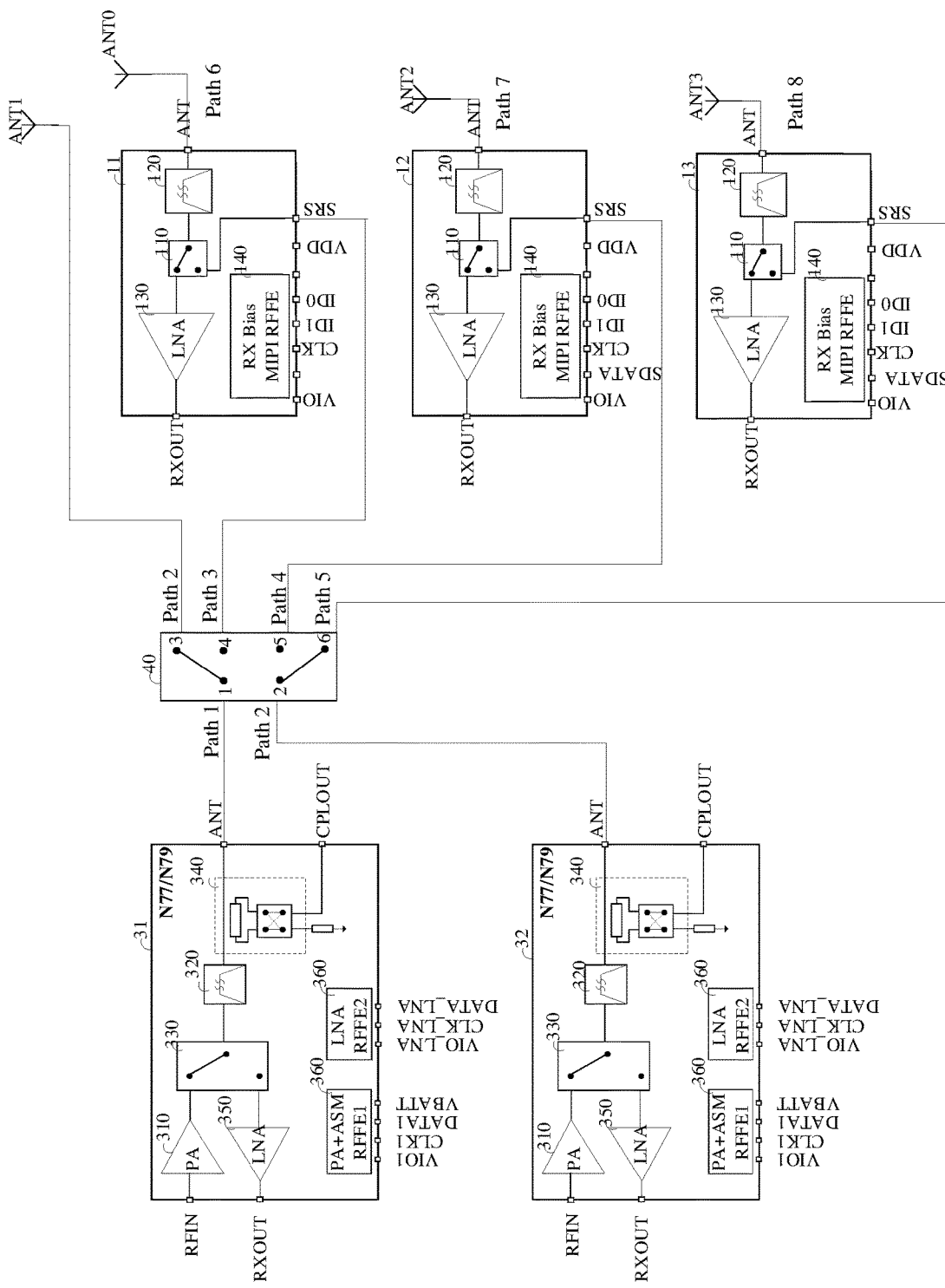
FIG. 13B is a sixth schematic structural diagram of a radio-frequency transceiving system according to an embodiment.

As illustrated in FIG. 13B, in an embodiment, the first filtering unit 120 in each of the first radio-frequency L-DRX device 11, the second radio-frequency L-DRX device 12, and the third radio-frequency L-DRX device 13 is disposed at the rear end of the first switching unit 110.

One first terminal of the multi-channel selection switch 40 is connected to the first radio-frequency PA Mid device 31. Another first terminal of the multi-channel selection switch 40 is connected to the second radio-frequency PA Mid device 32. One second terminal of the multi-channel selection switch 40 is connected to the first antenna Ant0. Another second terminal of the multi-channel selection switch 40 is connected to the second antenna Ant1 via the polling transmitting port SRS of the first radio-frequency L-DRX device 11. Yet another second terminal of the multi-channel selection switch 40 is connected to the third antenna Ant2 via the polling transmitting port SRS of the second radio-frequency L-DRX device 12. Still yet another second terminal of the multi-channel selection switch 40 is connected to the fourth antenna Ant3 via the polling transmitting port SRS of the third radio-frequency L-DRX device 13. In this way, a 2T4R SRS function can be supported.

In an embodiment, the multi-channel selection switch 40 and the radio-frequency PA Mid devices 30 are disposed discretely, and the multi-channel selection switch 40 is a radio-frequency DP4T switch. One first terminal (contact 1) of the radio-frequency DP4T switch is connected to the radio-frequency antenna port ANT of the first radio-frequency PA Mid device 31. Another first terminal (contact 2) of the radio-frequency DP4T switch is connected to the radio-frequency antenna port ANT of the second radio-frequency PA Mid device 32. One second terminal (contact 3) of the radio-frequency DP4T switch is connected to the second antenna Ant1. Another second terminal (contact 4) of the radio-frequency DP4T switch is connected to the first antenna Ant0 via the polling transmitting port SRS of the first radio-frequency L-DRX device 11. Yet another second terminal (contact 5) of the radio-frequency DP4T switch is connected to the third antenna Ant2 via the polling transmitting port SRS of the second radio-frequency L-DRX device 12. Still yet another second terminal (contact 6) of the radio-frequency DP4T switch is connected to the fourth antenna Ant3 via the polling transmitting port SRS of the third radio-frequency L-DRX device 13. In this way, the 2T4R SRS function can be supported.

The radio-frequency system according to this embodiment can support the quad-antenna 2T4R SRS function. Specific path configurations for 2T4R SRS are shown in Table 2.

TABLE 2

Detailed path configurations for 2T4R SRS

| | N41 | N77 | N79 |
| --- | --- | --- | --- |
| Channel 0 | Path 1->Path 3 | Path 1->Path 3 | Path 1->Path 3 |
| Channel 1 | Path 1->Path 4->Path 7 | Path 1->Path 4->Path 7 | Path 1->Path 4->Path 7 |
| Channel 2 | Path 2->Path 5->Path 8 | Path 2->Path 5->Path 8 | Path 2->Path 5->Path 8 |
| Channel 3 | Path 2->Path 6->Path 9 | Path 2->Path 6->Path 9 | Path 2->Path 6->Path 9 |

In Table 2, Channel 0, Channel 1, Channel 2, and Channel 3 are transmitting paths for polling transmission of the antennas.

The radio-frequency system according to the above embodiments can support the 1T4R SRS function or the 2T4R SRS function. In addition, with the radio-frequency system, by packaging the radio-frequency L-DRX device 10, the radio-frequency PA Mid device 30, and the multi-channel selection switch 20, the polling transmission of the radio-frequency signal at the first antenna Ant0, the second antenna Ant1, the third antenna Ant2, and the fourth antenna Ant3 can be realized without providing a plurality of independent cascade switches. In this way, the costs can be lowered, and an area of the substrate occupied by different components in the radio-frequency system can be reduced.

Figure 14:
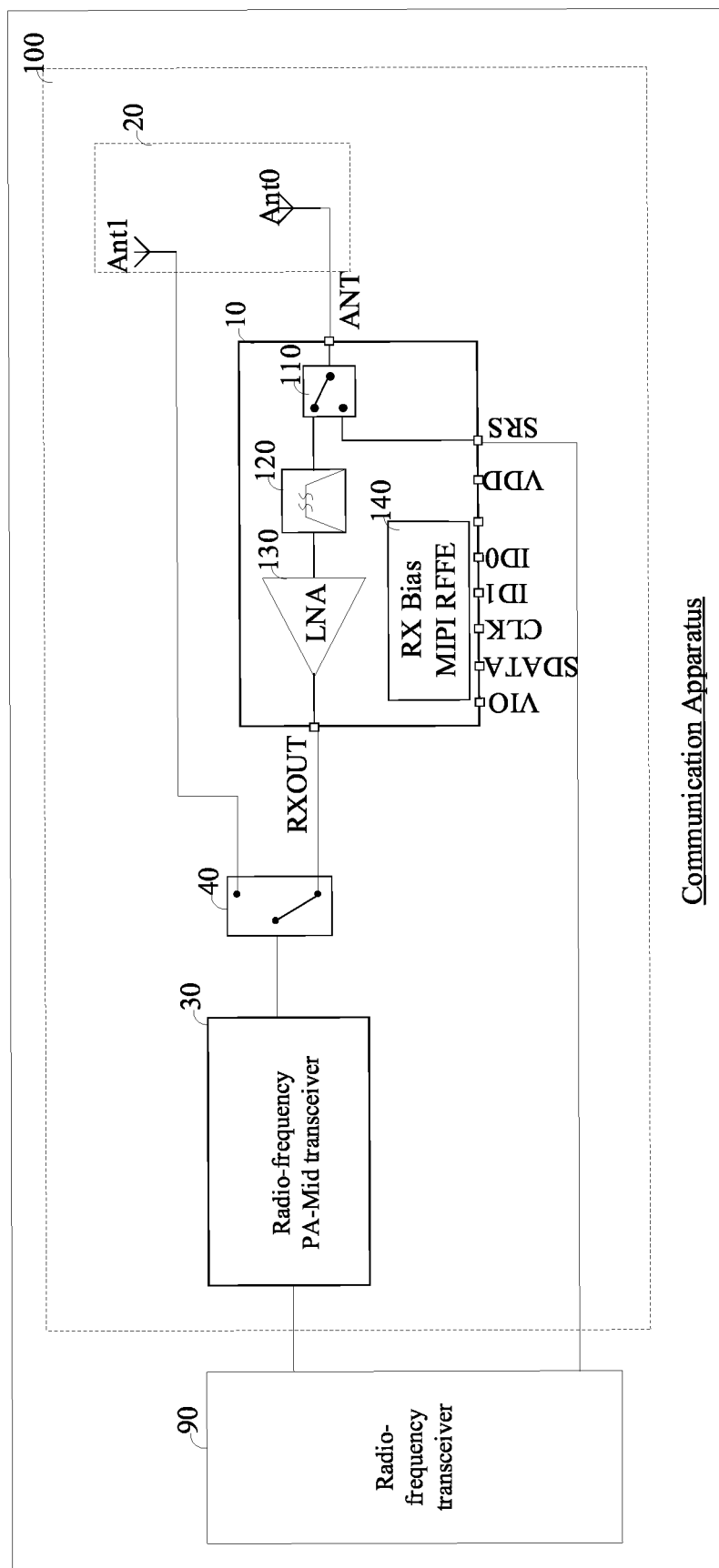
FIG. 14 is a schematic structural diagram of a communication apparatus according to an embodiment.

As illustrated in FIG. 14, according to an embodiment of the present disclosure, a communication apparatus is further provided. The communication apparatus includes the radio-frequency transceiving system 100 according to any of the above embodiments and a radio-frequency transceiver 90, which are disposed therein. For example, the radio-frequency transceiver 90 may include a transmitter (e.g., transmitter TX) and a receiver (e.g., receiver RX); or the radio-frequency transceiver 90 may include the receiver (e.g., receiver RX) only; or the radio-frequency transceiver 90 may include the transmitter (e.g., transmitter TX) only. The radio-frequency transceiver 90 can be configured to implement a frequency conversion processing between an intermediate frequency signal and a baseband signal and/or to implement a frequency conversion processing between an intermediate frequency signal and a high frequency signal, or the like.

By providing the radio-frequency transceiving system 100 in the communication apparatus, the integration level of the radio-frequency transceiving system 100 can be increased, and the area of the substrate occupied by different components in the radio-frequency transceiving system 100 can be reduced. In addition, the power supply, logic control, and PCB layout and wiring of the radio-frequency L-DRX device 10 can be simplified, thereby saving the costs.

While several embodiments of the present disclosure have been described above in a specific and detailed manner, the protection scope of the present disclosure cannot be construed as being limited to these embodiments. It should be noted that, those skilled in the art can make various variants and improvements without departing from the concept of the present disclosure, and these variants and improvements shall fall within the protection scope of present disclosure as defined by the claims as attached.

What is claimed is:

1. A radio-frequency Low Noise Amplifier-Diversity receive (RX) (L-DRX) device, having a receiving port and a polling transmitting port that are used for a connection to a radio-frequency transceiver, and an antenna port for a connection to an antenna, the radio-frequency L-DRX device comprising:

a first switching unit connected to the antenna port and the polling transmitting port, the first switching unit being configured to selectively switch on a receiving path where the receiving port is located and a transmitting path where the polling transmitting port is located;

a first filtering unit disposed in the receiving path or the transmitting path, the first filtering unit being configured to perform a filtering processing on a received or transmitted radio-frequency signal; and a first low noise amplifier disposed in the receiving path and having an output terminal connected to the receiving port, the first low noise amplifier being configured to amplify the filtered radio-frequency signal to be outputted via the receiving port.

2. The radio-frequency L-DRX device according to claim 1, wherein:

the first switching unit has a control terminal connected to the antenna port, and a plurality of selection terminals;

one of the plurality of selection terminals is connected to the polling transmitting port; and another one of the plurality of selection terminals is connected to the first filtering unit or the first low noise amplifier.

3. The radio-frequency L-DRX device according to claim 2, wherein the first filtering unit is disposed between the first switching unit and the receiving port.

4. The radio-frequency L-DRX device according to claim 3, wherein:

one terminal of the first filtering unit is connected to an input terminal of the first low noise amplifier, and the other terminal of the first filtering unit is connected to the another one of the plurality of selection terminals of the first switching unit; and the first filtering unit is configured to perform a filtering processing on the received radio- frequency signal on the receiving path.

5. The radio-frequency L-DRX device according to claim 2, wherein the first filtering unit is disposed between the first switching unit and the antenna port.

6. The radio-frequency L-DRX device according to claim 5, wherein:

one terminal of the first filtering unit is connected to the control terminal of the first switching unit, and the other terminal of the first filtering unit is connected to the antenna port; and the first filtering unit is configured to perform a filtering processing on a radio-frequency signal received on the receiving path or a radio-frequency signal transmitted on the transmitting path.

7. The radio-frequency L-DRX device according to claim 1, further comprising:

a control unit connected to the first low noise amplifier and the first switching unit, wherein the control unit is configured to:

adjust a gain coefficient of the first low noise amplifier to reduce a link loss of the receiving path; and control the first switching unit to selectively switch on the receiving path or the transmitting path.

8. The radio-frequency L-DRX device according to claim 1, wherein the radio-frequency signal is a 5th Generation Mobile Communication (5G) signal in an N41 frequency band, a 5G signal in an N77 frequency band, or a 5G signal in an N79 frequency band.

9. A radio-frequency transceiving system, comprising:

an antenna assembly at least comprising a first antenna and a second antenna, the antenna assembly being configured to transmit and receive a radio-frequency signal;

a radio-frequency Low Noise Amplifier-Diversity receive (RX) (L-DRX) device connected to the first antenna;

a radio-frequency Power Amplifier Modules including Duplexers (PA Mid) device configured to support an amplified transceiving control of the radio-frequency signal; and a multi-channel selection switch comprising a first terminal connected to the radio-frequency PA Mid device, and a plurality of second terminals, one of the plurality of second terminals being connected to the second antenna, another one of the plurality of second terminals being connected to the polling transmitting port of the radio-frequency L-DRX device, wherein the multi-channel selection switch is configured to selectively switch on a transmitting path where the first antenna is located and a transmitting path where the second antenna is located, to support a Sounding Reference Signal (SRS) function, wherein the radio-frequency L-DRX device has a receiving port and a polling transmitting port that are used for a connection to a radio-frequency transceiver, and an antenna port for a connection to an antenna, and wherein the radio-frequency L-DRX device comprises:

a first switching unit connected to the antenna port and the polling transmitting port, the first switching unit being configured to selectively switch on a receiving path where the receiving port is located and a transmitting path where the polling transmitting port is located;

a first filtering unit disposed in the receiving path or the transmitting path, the first filtering unit being configured to perform a filtering processing on a received or transmitted radio-frequency signal; and a first low noise amplifier disposed in the receiving path and having an output terminal connected to the receiving port, the first low noise amplifier being configured to amplify the filtered radio-frequency signal to be outputted via the receiving port.

10. The radio-frequency transceiving system according to claim 9, wherein the radio-frequency PA Mid device has a radio-frequency transmitting port, a radio-frequency receiving port, and a radio-frequency antenna port, and wherein the radio-frequency PA Mid device comprises:

a power amplifier having an input terminal connected to the radio-frequency transmitting port, the power amplifier being configured to receive the radio-frequency signal transmitted by the radio-frequency transceiver and perform a power amplification processing on the radio-frequency signal;

a second filtering unit connected to the radio-frequency antenna port and configured to perform a filtering processing on the received radio-frequency signal; and a second switching unit connected to an output terminal of the power amplifier, the radio-frequency receiving port, and the second filtering unit, wherein the second switching unit is configured to selectively switch on a receiving path where the radio-frequency receiving port is located and a transmitting path where the radio-frequency transmitting port is located.

11. The radio-frequency transceiving system according to claim 10, wherein the radio-frequency PA Mid device further has a coupling output port, and wherein the radio-frequency PA Mid device further comprises:

a coupling unit having an input terminal coupled to the second filtering unit, an output terminal coupled to the radio-frequency antenna port, a first coupling terminal, and a second coupling terminal, the coupling unit being configured to couple the radio-frequency signal in the transmitting path; and a coupling switch connected to the first coupling terminal, the second coupling terminal, and the coupling output port, the coupling switch being configured to selectively switch on a coupling path between the first coupling terminal and the coupling output port and a coupling path between the second coupling terminal and the coupling output port.

12. The radio-frequency transceiving system according to claim 10, wherein the radio-frequency PA Mid device further comprises:

a second low noise amplifier having an input terminal connected to the second switching unit and an output terminal connected to the radio-frequency receiving port, the second low noise amplifier being configured to amplify the radio-frequency signal in the receiving path.

13. The radio-frequency transceiving system according to claim 9, wherein:
the antenna assembly further comprises a third antenna and a fourth antenna;
three radio-frequency L-DRX devices are provided as a first radio-frequency L-DRX device, a second radio-frequency L-DRX device, and a third radio-frequency L-DRX device, respectively;
the first terminal of the multi-channel selection switch is connected to the three radio-frequency L-DRX devices; and
one of the plurality of second terminals of the multi-channel selection switch is connected to the second antenna, another one of the plurality of second terminals of the multi-channel selection switch is connected to the first antenna via a polling transmitting port of the first radio-frequency L-DRX device, yet another one of the plurality of second terminals of the multi-channel selection switch is connected to the third antenna via a polling transmitting port of the second radio-frequency L-DRX device, and still yet another one of the plurality of second terminals of the multi-channel selection switch is connected to the fourth antenna via a polling transmitting port of the third radio-frequency L-DRX device, to support a 1T4R SRS function.

14. The radio-frequency transceiving system according to claim 13, wherein:
two radio-frequency PA Mid devices are provided as a first radio-frequency PA Mid device and a second radio-frequency PA Mid device, respectively;
one first terminal of the multi-channel selection switch is connected to the first radio-frequency PA Mid device, and another first terminal of the multi-channel selection switch is connected to the second radio-frequency PA Mid device; and
one of the plurality of second terminals of the multi-channel selection switch is connected to the second antenna, another one of the plurality of second terminals of the multi-channel selection switch is connected to the first antenna via a polling transmitting port of the first radio-frequency L-DRX device, yet another one of the plurality of second terminals of the multi-channel selection switch is connected to the third antenna via a polling transmitting port of the second radio-frequency L-DRX device, and still yet another one of the plurality of second terminals of the multi-channel selection switch is connected to the fourth antenna via a polling transmitting port of the third radio-frequency L-DRX device, to support a 2T4R SRS function.

15. The radio-frequency transceiving system according to claim 13, wherein the multi-channel selection switch is a radio-frequency Single-Pole Four-Throw (SP4T) switch.

16. The radio-frequency transceiving system according to claim 14, wherein the multi-channel selection switch is a radio-frequency Double-Pole Four-Throw (DP4T) switch.

17. The radio-frequency transceiving system according to claim 10, wherein the second filtering unit comprises a low-pass filter.

18. The radio-frequency transceiving system according to claim 10, wherein the second switching unit is a radio-frequency Single Pole Double Throw (SPDT) switch.

19. The radio-frequency transceiving system according to any one of claim 10, wherein:
the multi-channel selection switch is integrated in the radio-frequency PA Mid device; and
the integrated radio-frequency PA Mid device has a plurality of radio-frequency antenna ports; and
the plurality of second terminals of the multi-channel selection switch is connected to the plurality of radio-frequency antenna ports in a one-to-one correspondence.

20. A communication apparatus, comprising:
a radio-frequency transceiver; and
a radio-frequency transceiving system connected to the radio-frequency transceiver, the radio-frequency transceiving system comprising:
an antenna assembly at least comprising a first antenna and a second antenna, the antenna assembly being configured to transmit and receive a radio-frequency signal;
a radio-frequency Low Noise Amplifier-Diversity receive (RX) (L-DRX) device connected to the first antenna;
a radio-frequency Power Amplifier Modules including Duplexers (PA Mid) device configured to support an amplified transceiving control of the radio-frequency signal; and
a multi-channel selection switch comprising a first terminal connected to the radio-frequency PA Mid device, and a plurality of second terminals, one of the plurality of second terminals being connected to the second antenna, another one of the plurality of second terminals being connected to the polling transmitting port of the radio-frequency L-DRX device, wherein the multi-channel selection switch is configured to selectively switch on a transmitting path where the first antenna is located and a transmitting path where the second antenna is located, to support a Sounding Reference Signal (SRS) function,
wherein the radio-frequency L-DRX device has a receiving port and a polling transmitting port that are used for a connection to a radio-frequency transceiver, and an antenna port for a connection to an antenna, and
wherein the radio-frequency L-DRX device comprises:
a first switching unit connected to the antenna port and the polling transmitting port, the first switching unit being configured to selectively switch on a receiving path where the receiving port is located and a transmitting path where the polling transmitting port is located;
a first filtering unit disposed in the receiving path or the transmitting path, the first filtering unit being configured to perform a filtering processing on a received or transmitted radio-frequency signal; and
a first low noise amplifier disposed in the receiving path and having an output terminal connected to the receiving port, the first low noise amplifier being configured to amplify the filtered radio-frequency signal to be outputted via the receiving port.

* * * * *